United States Patent
Kobayashi et al.

(10) Patent No.: US 10,507,529 B2
(45) Date of Patent: Dec. 17, 2019

(54) CUTTING TOOL AND METHOD OF MANUFACTURING MACHINED PRODUCT USING THE SAME

(71) Applicant: Kyocera Corporation, Kyoto-shi, Kyoto (JP)

(72) Inventors: Youji Kobayashi, Yasu (JP); Atsumi Nishimoto, Yasu (JP)

(73) Assignee: KYOCERA CORPORATION, Kyoto-shi, Kyoto (JP)

(*) Notice: Subject to any disclaimer, the term of this patent is extended or adjusted under 35 U.S.C. 154(b) by 0 days.

(21) Appl. No.: 15/746,813

(22) PCT Filed: Jul. 25, 2016

(86) PCT No.: PCT/JP2016/071691
§ 371 (c)(1),
(2) Date: Jan. 23, 2018

(87) PCT Pub. No.: WO2017/018369
PCT Pub. Date: Feb. 2, 2017

(65) Prior Publication Data
US 2018/0318935 A1  Nov. 8, 2018

(30) Foreign Application Priority Data

Jul. 24, 2015 (JP) .................. 2015-146618
Jan. 28, 2016 (JP) .................. 2016-014255

(51) Int. Cl.
*B23B 27/10* (2006.01)
*B23B 29/04* (2006.01)
*B23B 1/00* (2006.01)

(52) U.S. Cl.
CPC ............. *B23B 27/10* (2013.01); *B23B 1/00* (2013.01); *B23B 29/043* (2013.01); *B23B 2200/0447* (2013.01)

(58) Field of Classification Search
CPC ... B23B 1/00; B23B 2200/0447; B23B 27/10; B23B 29/043; B23B 27/1666; B23C 5/28; B23Q 11/10
See application file for complete search history.

(56) References Cited

U.S. PATENT DOCUMENTS 4,838,136 A * 6/1989 Kress ............... B23B 29/16
                                          407/11
5,358,360 A * 10/1994 Mai ............... B23Q 11/1084
                                          279/20
(Continued)

FOREIGN PATENT DOCUMENTS

JP       08025111 A  *  1/1996
JP    2001087906 A     4/2001
(Continued)

OTHER PUBLICATIONS

International Search Report based on Application No. PCT/JP2016/071691 (1 Page) dated Aug. 16, 2016.

*Primary Examiner* — Sara Addisu
(74) *Attorney, Agent, or Firm* — Viering, Jentschura & Partner MBB

(57) ABSTRACT

In an embodiment, a cutting tool is disclosed. The cutting tool includes a holder and an insert. The holder has a shape extending from a first end to a second end, and includes a flow path and a pocket located at a side of the first end. The insert is located at the pocket. The flow path includes a first flow path and a second flow path. The first flow path includes a first opening located at a side of the first end and located above the insert. The second flow path includes a second opening located at a side of the first end and located above the first opening. A first imaginary line of the first flow path and a second imaginary line of the second flow path (Continued)

intersect each other above the insert. A method of manufacturing a machine product by using the cutting tool is also disclosed.

14 Claims, 27 Drawing Sheets

(56) References Cited

U.S. PATENT DOCUMENTS

| | | | | |
|---|---|---|---|---|
| 5,388,487 A * | 2/1995 | Danielsen | ............... | B23B 29/04 279/2.08 |
| 5,638,728 A * | 6/1997 | Smith | ............... | B23B 27/04 407/101 |
| 6,000,885 A * | 12/1999 | Erickson | ............... | B23B 27/045 407/111 |
| 6,312,199 B1 * | 11/2001 | Sjoden | ............... | B23B 27/10 407/11 |
| 6,443,672 B1 * | 9/2002 | Lagerberg | ............... | B23B 27/10 407/11 |
| 6,471,448 B1 | 10/2002 | Lagerberg | | |
| 7,063,487 B2 * | 6/2006 | Hessman | ............... | B23B 27/06 407/103 |
| 7,568,864 B2 * | 8/2009 | Sjoo | ............... | B23B 27/04 407/11 |
| 7,959,384 B2 * | 6/2011 | Breisch | ............... | B23B 27/10 407/109 |
| 8,215,878 B2 * | 7/2012 | Rozzi | ............... | B23C 5/207 407/11 |
| 8,827,598 B2 * | 9/2014 | Henry | ............... | B23B 27/04 407/11 |
| 9,346,103 B2 * | 5/2016 | Luik | ............... | B23B 27/10 |
| 9,878,372 B2 * | 1/2018 | Yang | ............... | B23B 27/10 |
| 2002/0122698 A1 * | 9/2002 | Lagerberg | ............... | B23B 27/10 407/11 |
| 2002/0127067 A1 * | 9/2002 | Lagerberg | ............... | B23B 29/046 407/11 |
| 2009/0311055 A1 * | 12/2009 | Galota | ............... | B23C 5/28 407/11 |
| 2012/0230780 A1 * | 9/2012 | Henry | ............... | B23B 27/10 407/11 |
| 2014/0133924 A1 * | 5/2014 | Oren | ............... | B23B 29/043 407/11 |
| 2014/0356082 A1 * | 12/2014 | Smith | ............... | B23B 27/10 407/11 |
| 2015/0132074 A1 * | 5/2015 | Boissonnet | ............... | B23B 29/043 407/11 |
| 2015/0290716 A1 * | 10/2015 | Herberth | ............... | B23B 25/02 407/11 |
| 2015/0352640 A1 * | 12/2015 | Frota de Souza Filho | ............... | B23B 27/10 407/11 |
| 2016/0175938 A1 * | 6/2016 | Kaufmann | ............... | B23B 27/10 407/11 |
| 2016/0236281 A1 | 8/2016 | Kitagawa | | |
| 2016/0339523 A1 * | 11/2016 | Graf | ............... | B23B 27/10 |
| 2018/0326500 A1 * | 11/2018 | Kaufmann | ............... | B23B 27/04 |
| 2018/0369923 A1 * | 12/2018 | Chen | ............... | B23B 27/10 |
| 2019/0015904 A1 * | 1/2019 | Kobayashi | ............... | B23B 27/10 |

FOREIGN PATENT DOCUMENTS

| | | | |
|---|---|---|---|
| JP | 2014231097 A | * | 12/2014 |
| WO | 2015056496 A1 | | 4/2015 |

* cited by examiner

CUTTING TOOL AND METHOD OF MANUFACTURING MACHINED PRODUCT USING THE SAME

RELATED APPLICATIONS

The present application is a national stage entry according to 35 U.S.C. § 371 of PCT application No.: PCT/JP2016/071691 filed on Jul. 25, 2016, which claims priority from Japanese application No. 2015-146618 filed on Jul. 24, 2015, and Japanese application No. 2016-014255 filed on Jan. 28, 2016, are incorporated herein by reference in its entirety.

TECHNICAL FIELD

The present disclosure relates to a cutting tool for use in a cutting process, such as a milling process or a turning process, and a method of manufacturing a machined product using the cutting tool.

BACKGROUND ART

As a cutting tool for use in a cutting process of a workpiece, such as metals, a cutting tool described in Patent Document 1 has been known. The cutting tool described in Patent Document 1 includes a tool body (holder) and a cutting insert, and is used for the turning process, such as external machining. The tool body in the cutting tool described in Patent Document 1 includes a first nozzle and a second nozzle individually located above the cutting insert. A cooling fluid (coolant) is sprayed from the first nozzle toward an upper side surface of the cutting insert. The cooling fluid is also sprayed from the second nozzle toward a higher level position than the cutting insert.

In the cutting tool described in Patent Document 1, a region where the cooling fluid is sprayed from the first nozzle and the second nozzle is locally cooled down. Therefore, cooling in portions other than the region may become insufficient.

PRIOR ART DOCUMENTS

Patent Document

Patent Document 1: Japanese Unexamined Patent Publication No. 2001-087906

SUMMARY

In an embodiment, a cutting tool includes a holder and an insert. The holder has a shape extending from a first end to a second end. The holder includes a flow path including an inflow port and an outflow port, and a pocket located at a side of the first end. The insert is located at the pocket and includes a cutting edge located in at least a part of a ridge where a first surface intersects with a second surface. The flow path includes a first flow path and a second flow path. The first flow path includes, as the outflow port, a first opening located at a side of the first end and located above the insert. The second flow path includes, as the outflow port, a second opening located at a side of the first end and located above the first opening. A first imaginary line and a second imaginary line intersect each other above the insert when the first imaginary line is a line obtained by allowing a first central axis at a side of the first opening of the first flow path to extend outward from the holder, and the second imaginary line is a line obtained by allowing a second central axis at a side of the second opening of the second flow path to extend outward from the holder.

In an embodiment, a method of manufacturing a machined product includes rotating a workpiece, bringing the cutting tool into contact with the workpiece being rotated, and moving the cutting tool away from the workpiece.

EMBODIMENTS

<Cutting Tool>

Figure 1:
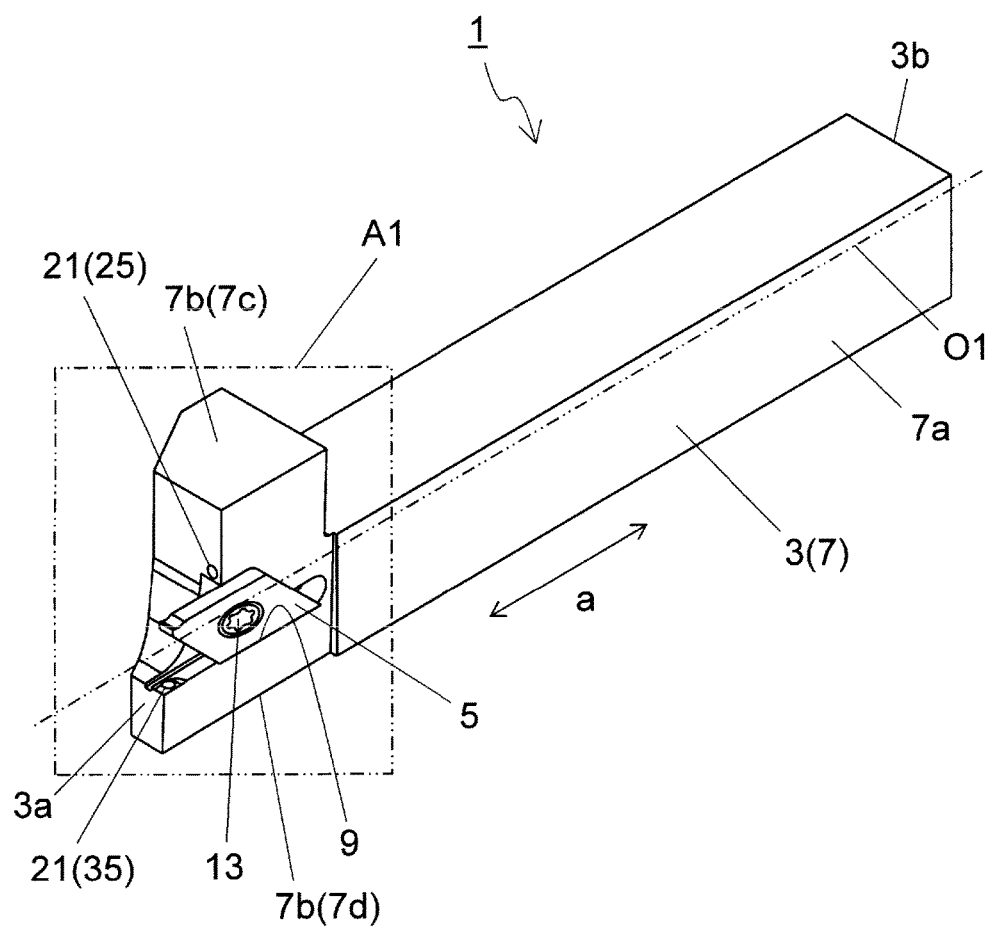
FIG. 1 is a perspective view illustrating a cutting tool in a first embodiment of the present disclosure.

A cutting tool in an embodiment of the present disclosure is described in detail below with reference to the drawings. For the sake of description, each of the drawings referred to in the following illustrates, in a simplified form, only main members necessary for describing the present embodiment. Hence, the cutting tool of the present disclosure is capable of including any structural member not illustrated in the drawings referred to. Sizes of the members in each of the drawings are not ones which faithfully represent the sizes of the actual structural members and size ratios of these members.

First Embodiment

Figure 2:
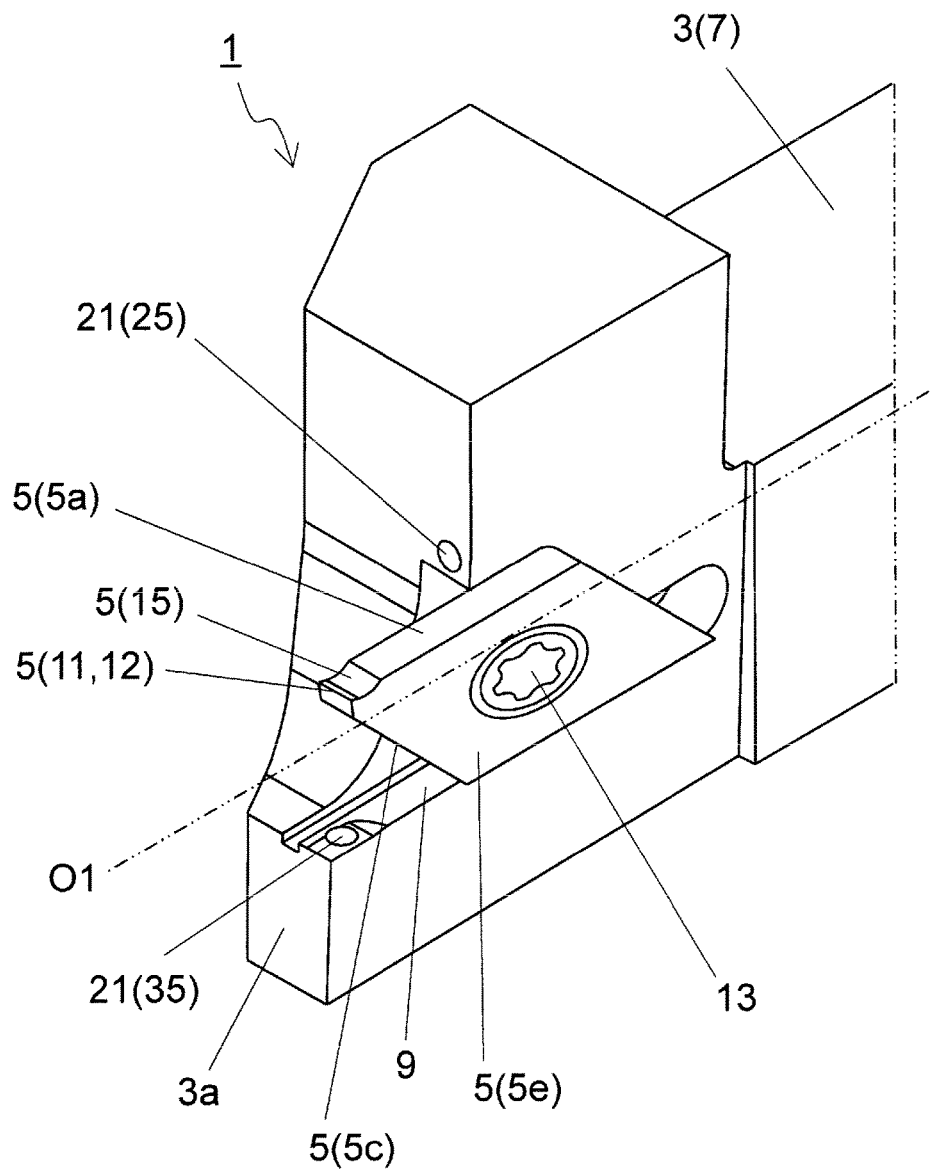
FIG. 2 is an enlarged view of a region A1 illustrated in FIG. 1.
Figure 3:
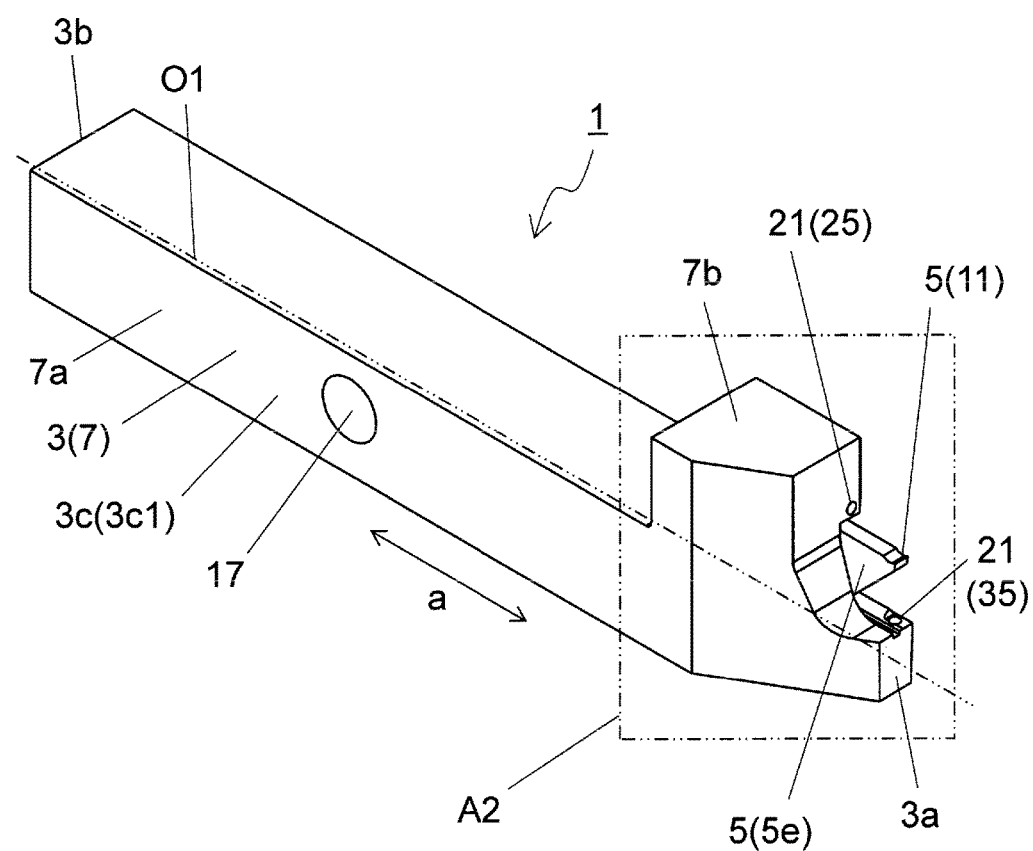
FIG. 3 is a perspective view when the cutting tool illustrated in FIG. 1 is viewed from another direction.
Figure 4:
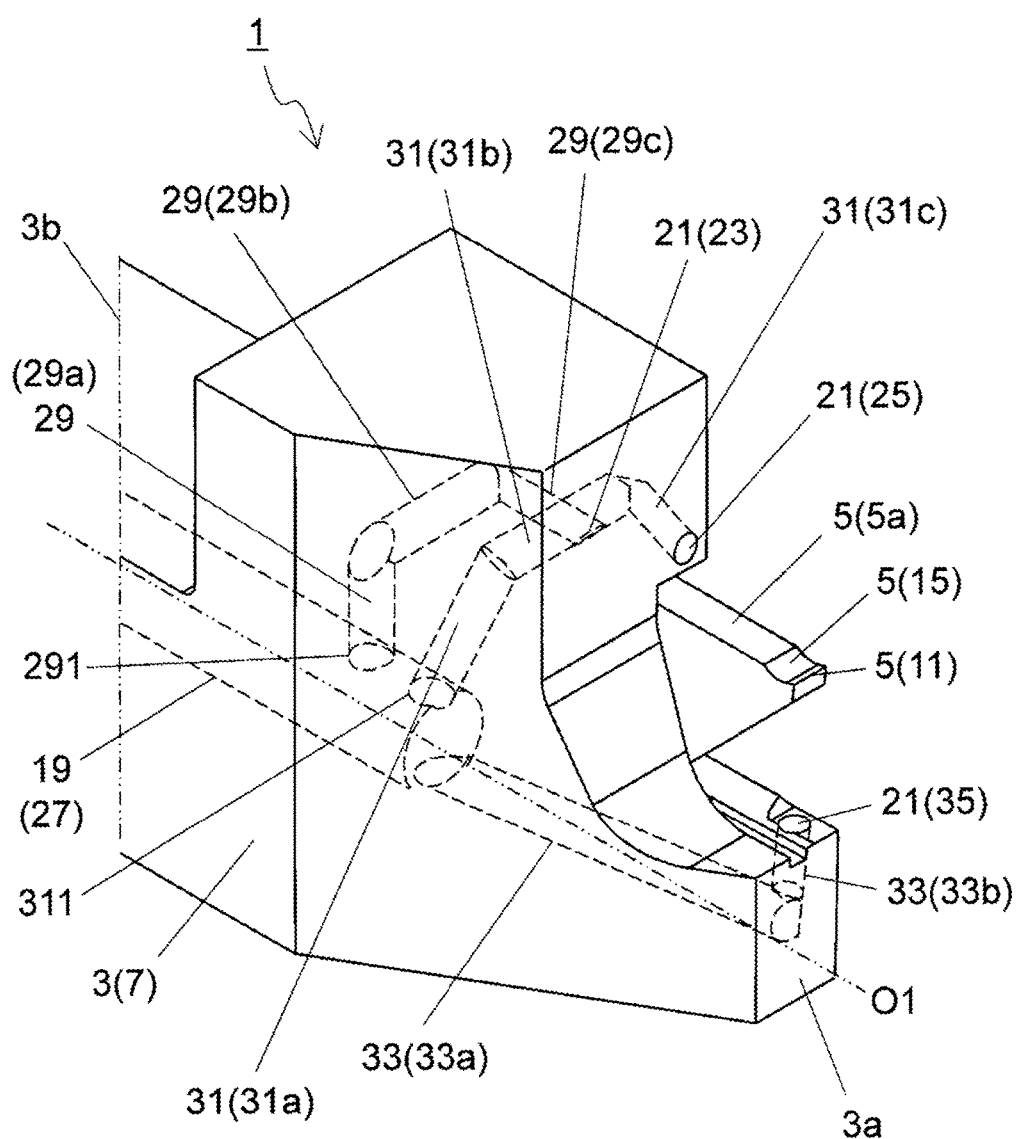
FIG. 4 is an enlarged view of a region A2 illustrated in FIG. 3.

FIG. 1 is an external perspective view illustrating a cutting tool 1 in a first embodiment of the present disclosure. FIG. 2 is an enlarged view in a region A1 illustrated in FIG. 1. FIG. 2 illustrates, in enlarged dimension, a side of a first end 3a of a holder 3 in the cutting tool 1. FIG. 3 is a perspective view when the cutting tool 1 illustrated in FIG. 1 is viewed from another direction. FIG. 4 is an enlarged view of a region A2 illustrated in FIG. 3. FIG. 4 illustrates, in enlarged dimension, the side of the first end 3a of the holder 3 in the cutting tool 1, as in FIG. 2.

Figure 5:
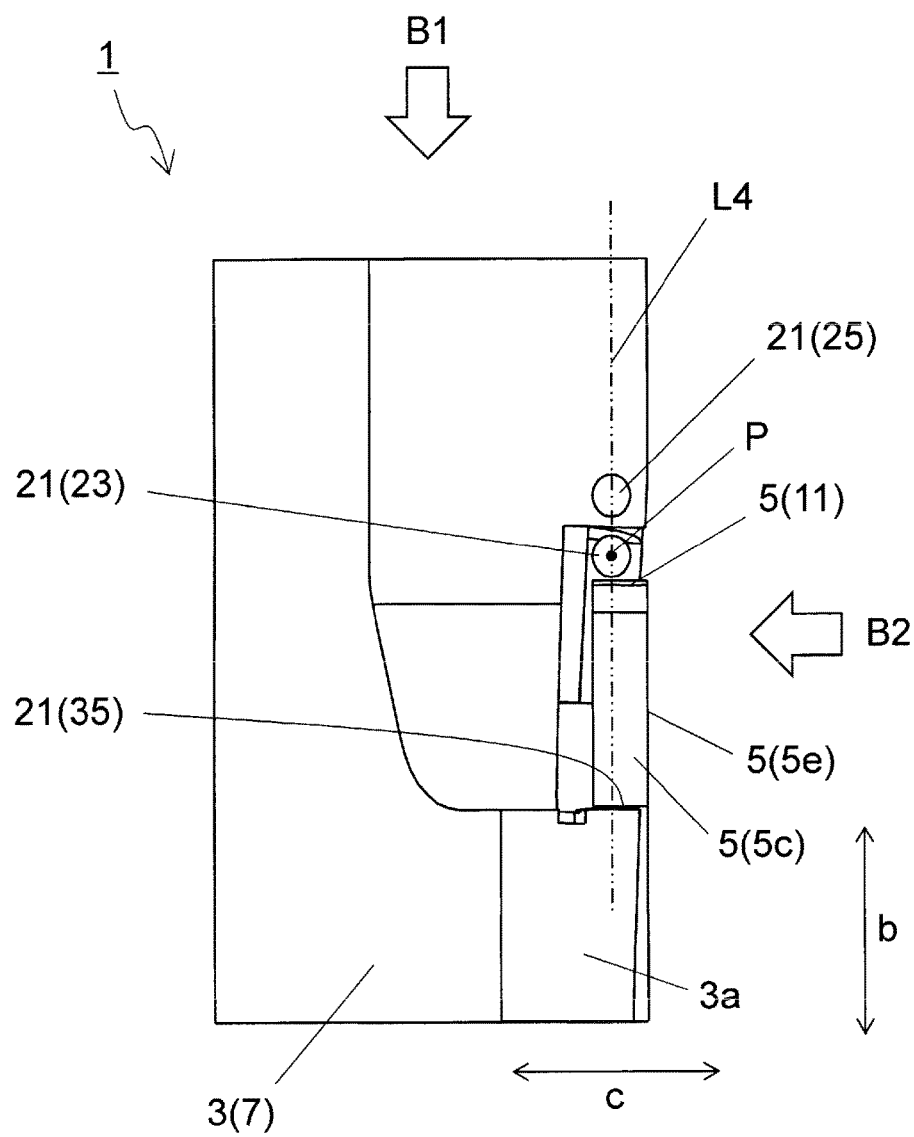
FIG. 5 is a front view taken from a first end of a holder in the cutting tool illustrated in FIG. 1.
Figure 6:
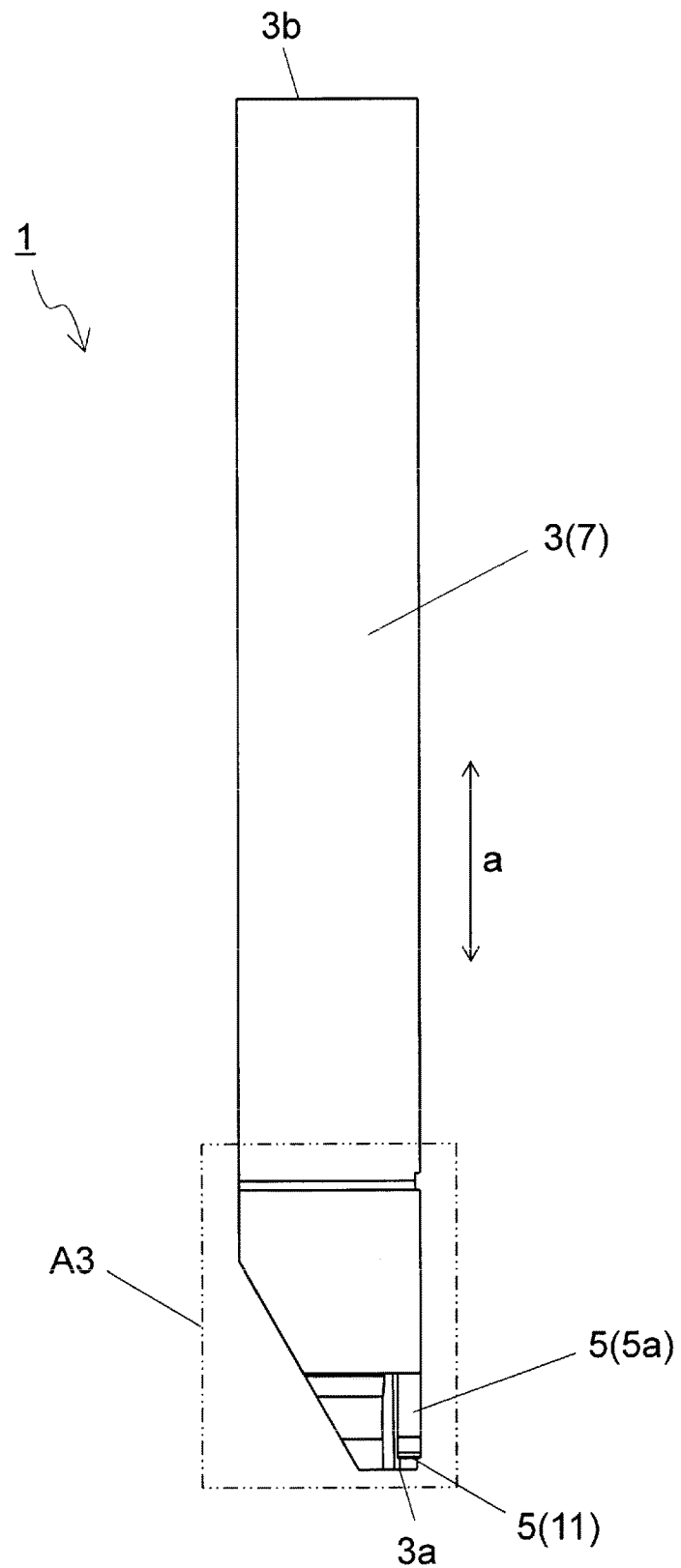
FIG. 6 is a top view when the cutting tool illustrated in FIG. 5 is viewed from B1 direction.
Figure 7:
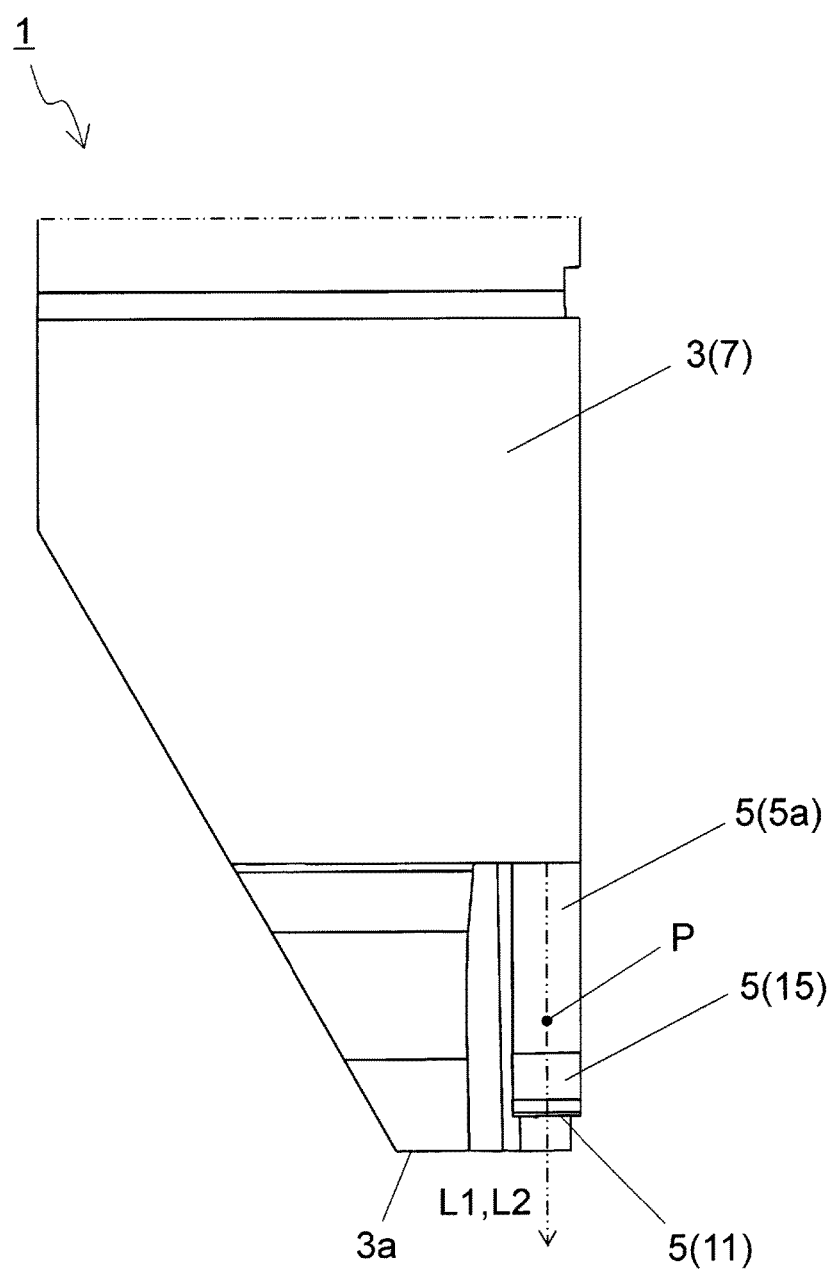
FIG. 7 is an enlarged view of a region A3 illustrated in FIG. 6.

FIG. 5 is a side view when the cutting tool 1 illustrated in FIG. 1 is viewed from the side of the first end 3a of the holder 3. FIG. 6 is a top view when the cutting tool 1 illustrated in FIG. 5 is viewed from B1 direction. FIG. 7 is an enlarged view of a region A3 illustrated in FIG. 6. FIG. 7 illustrates, in enlarged dimension, the side of the first end 3a of the holder 3 in the cutting tool 1, as in FIGS. 2 and 4.

Figure 8:
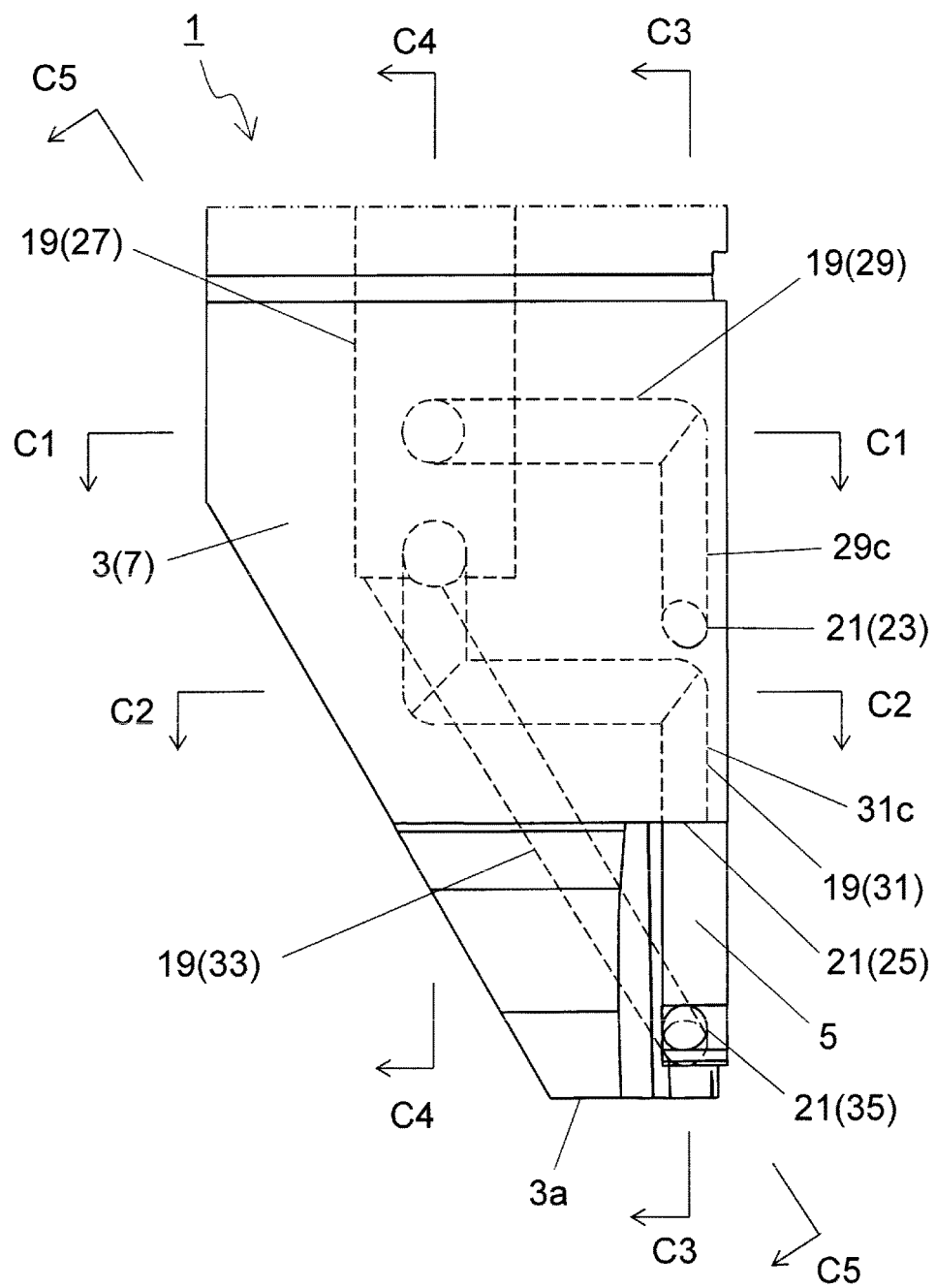
FIG. 8 is a top perspective view in the same region as in the cutting tool illustrated in FIG. 7.
Figure 9:
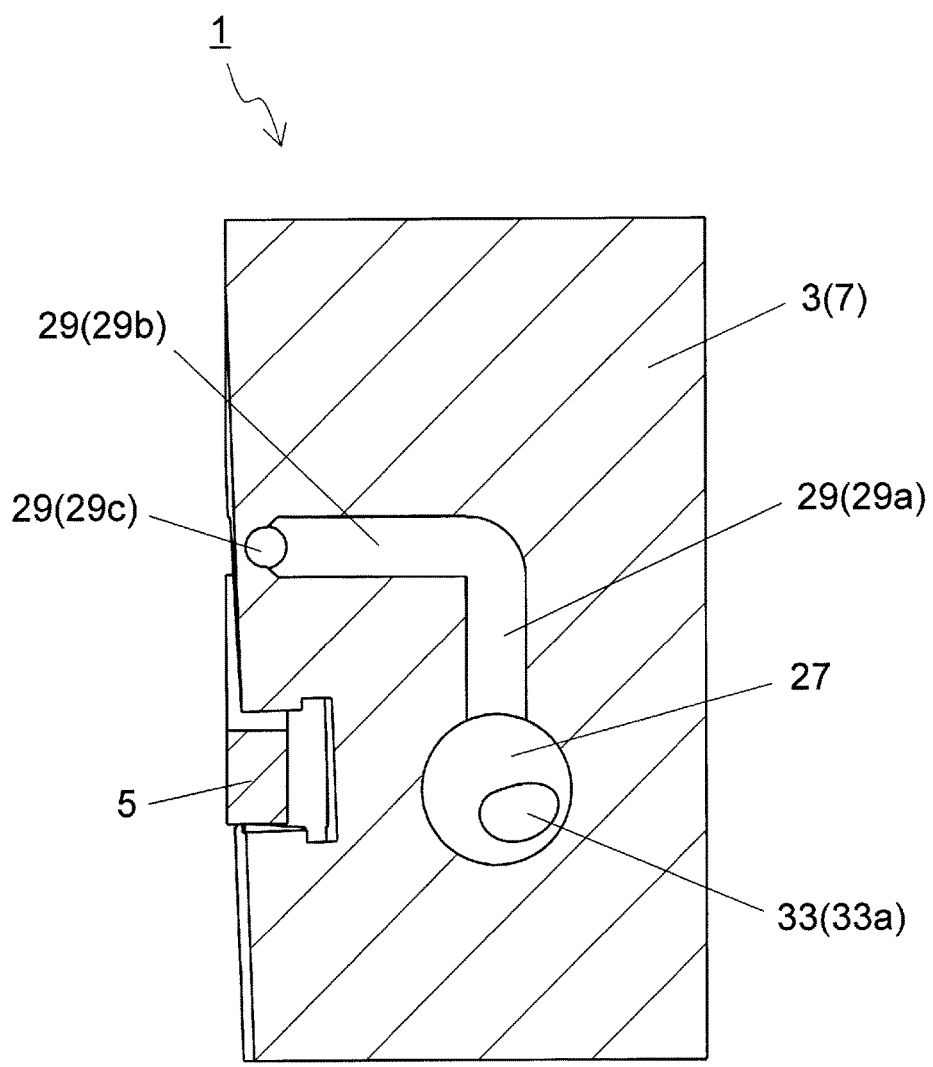
FIG. 9 is a sectional view taken along line C1-C1 in FIG. 8.
Figure 10:
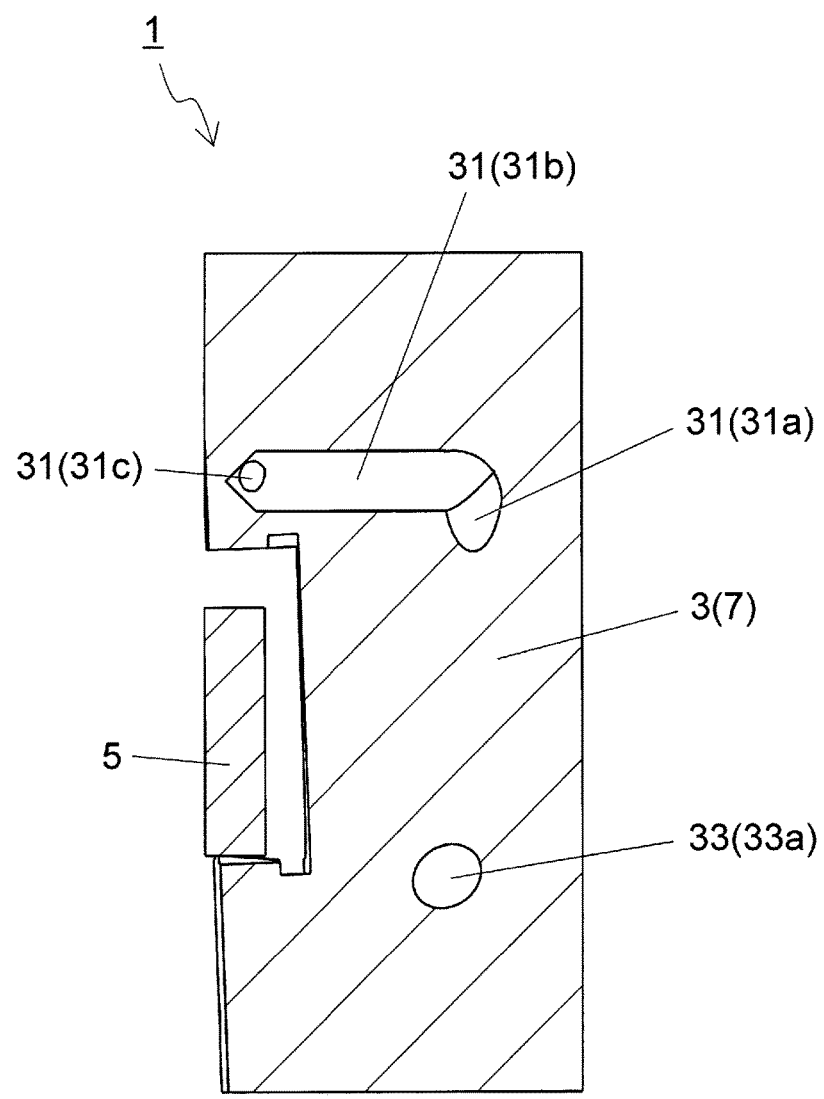
FIG. 10 is a sectional view taken along line C2-C2 in FIG. 8.

FIG. 8 is a top perspective view in the same region as in the cutting tool 1 illustrated in FIG. 7. Therefore, FIG. 8 illustrates a flow path 19 seen through. FIGS. 9 to 13 are respectively sectional views taken along lines C1-C1 to C5-C5 in FIG. 8.

Figure 14:
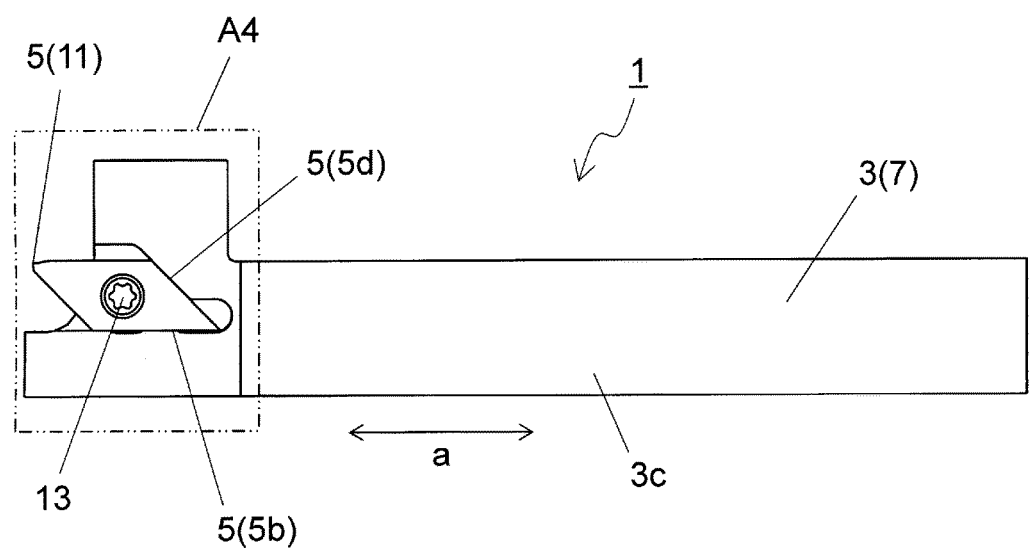
FIG. 14 is a side view when the cutting tool illustrated in FIG. 5 is viewed from B2 direction.
Figure 15:
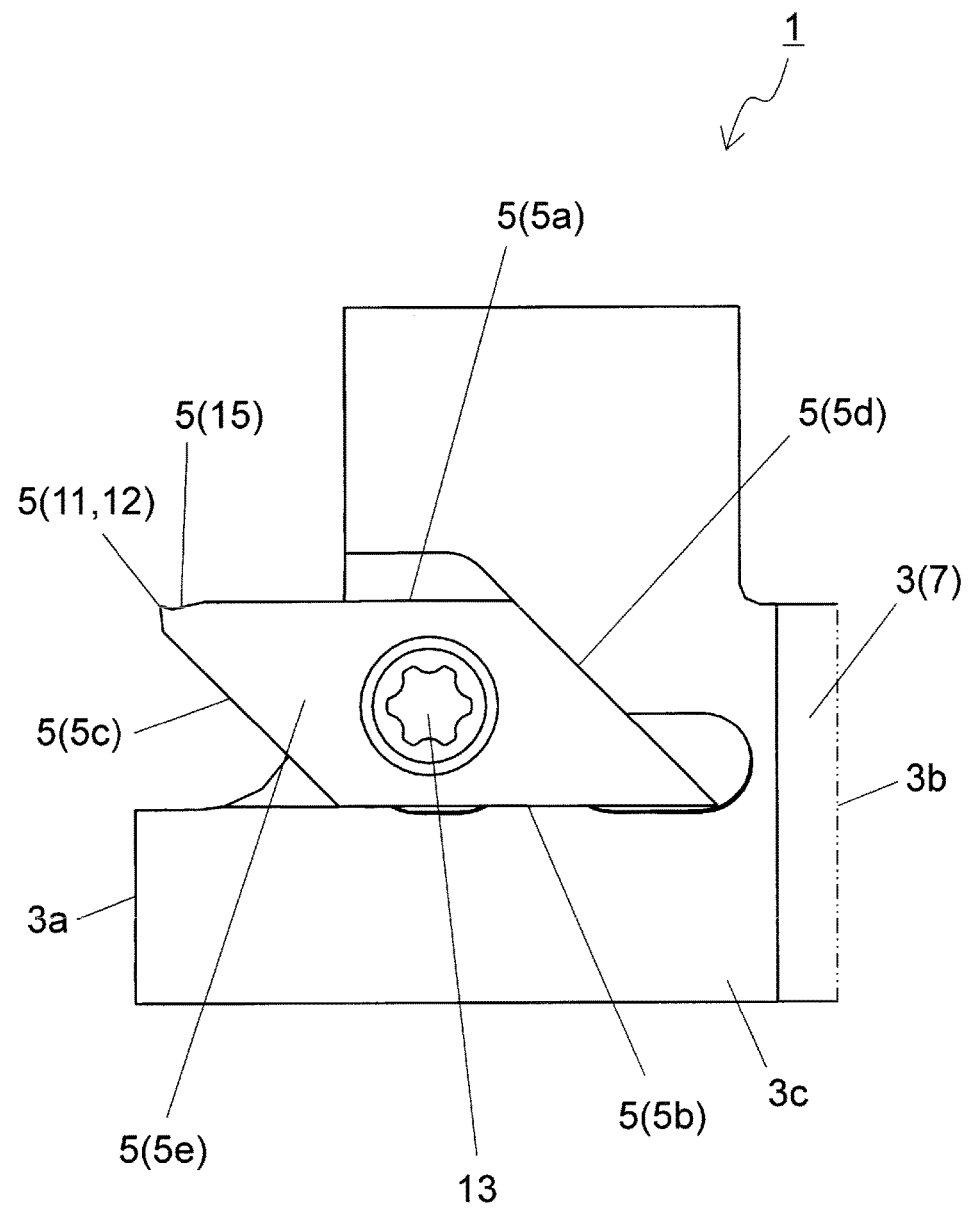
FIG. 15 is an enlarged view of a region A4 illustrated in FIG. 14.
Figure 16:
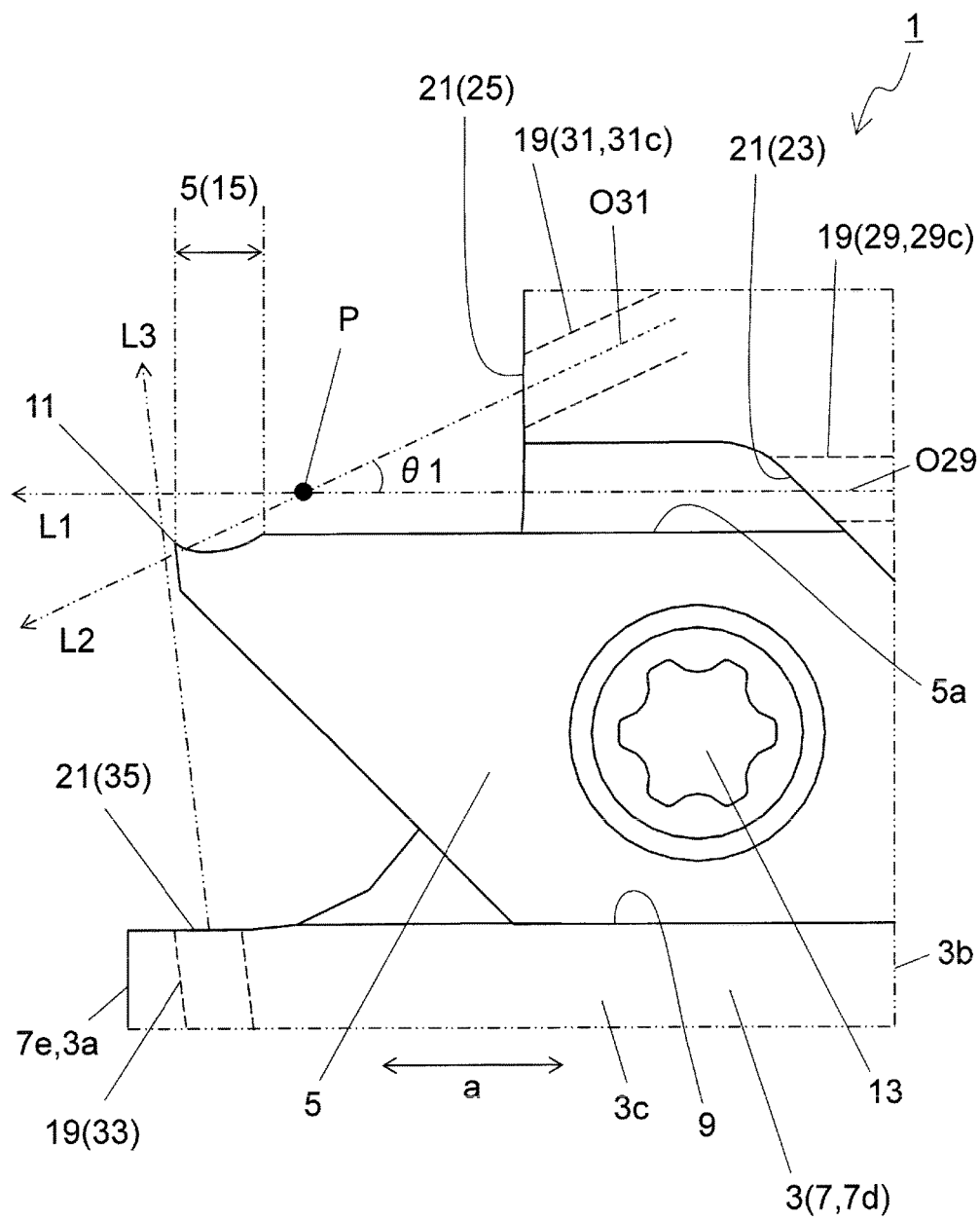
FIG. 16 is a schematic diagram illustrating a coolant flow in the cutting tool illustrated in FIG. 15.
Figure 17:
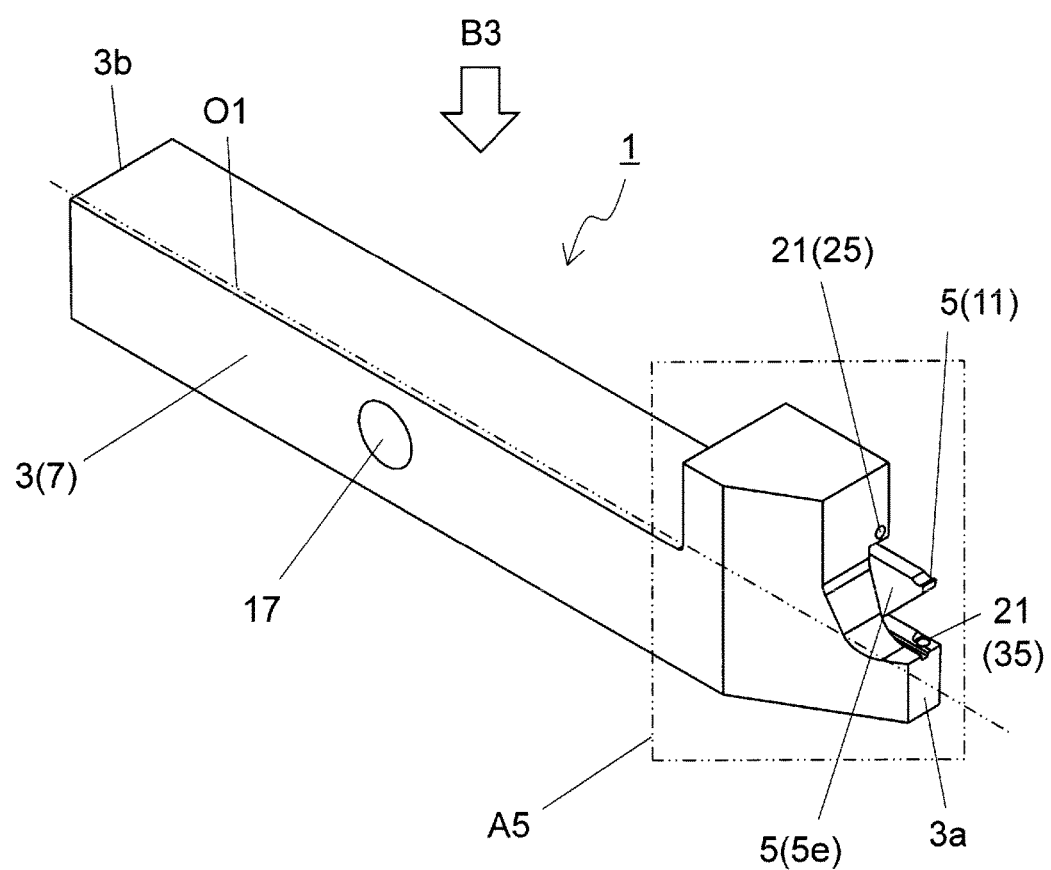
FIG. 17 is a perspective view illustrating a cutting tool in a second embodiment of the present disclosure.

FIG. 14 is a side view when the cutting tool 1 illustrated in FIG. 5 is viewed from B2 direction. FIG. 15 is an enlarged view of a region A4 illustrated in FIG. 14. FIG. 16 is an enlarged view of the side of the first end 3a of the holder 3 in the cutting tool 1 illustrated in FIG. 15, and illustrates a coolant flow.

The cutting tool 1 of the present embodiment includes the holder 3 and an insert 5 as illustrated in FIGS. 1 to 4. The holder 3 is shaped to extend from the first end 3a to a second end 3b as illustrated in FIGS. 1 and 3. The holder 3 includes a body part 7 and a pocket 9. The insert 5 includes a cutting edge 11 as illustrated in FIG. 2. The cutting tool 1 of the present embodiment is a tool for use in so-called turning process. Alternatively, the cutting tool 1 may be a tool for use in a so-called milling process.

The body part 7 is a bar-shaped member extending from the side of the first end 3a of the holder 3, at which the insert 5 is located, toward a side of the second end 3b. Specifically, the body part 7 is a quadrangular prism-shaped member extending along a central axis O1 as illustrated in FIGS. 1 and 3. The central axis O1 is indicated by a two-dot chain line in FIGS. 1 to 4. The central axis O1 is a central axis of a base member 7a of the body part 7, except for a head 7b located at a portion of the first end 3a. The base member 7a is a portion that functions as a shank designed to secure the holder 3 into a machine tool. The head 7b is a portion designed to receive the insert 5, and includes an upper jaw 7c and a lower jaw 7d.

For example, steel, cast iron, and aluminum alloy are usable as a material of the body part 7. The body part 7 in the present embodiment employs steel having high toughness among these materials. The size of the body part 7 is suitably settable according to a workpiece size. For example, a length in a direction along the central axis O1 is settable to approximately 60-200 mm. A width in a direction orthogonal to the central axis O1 is settable to approximately 6-50 mm.

The pocket 9 is located at the side of the first end 3a of the holder 3. The cutting tool 1 illustrated in FIGS. 1 to 16 is an embodiment that the holder 3 includes the single pocket 9. The pocket 9 is a region at which the insert 5 is located, and the region is recessed at the side of the first end 3a of the holder 3 before attachment of the insert 5. The insert 5 is designed to be attached so that a cutting edge 11 protrudes at the side of the first end 3a of the holder 3. The cutting tool 1 is designed so that a cutting process is carried out by the cutting edge 11.

Figure 11:
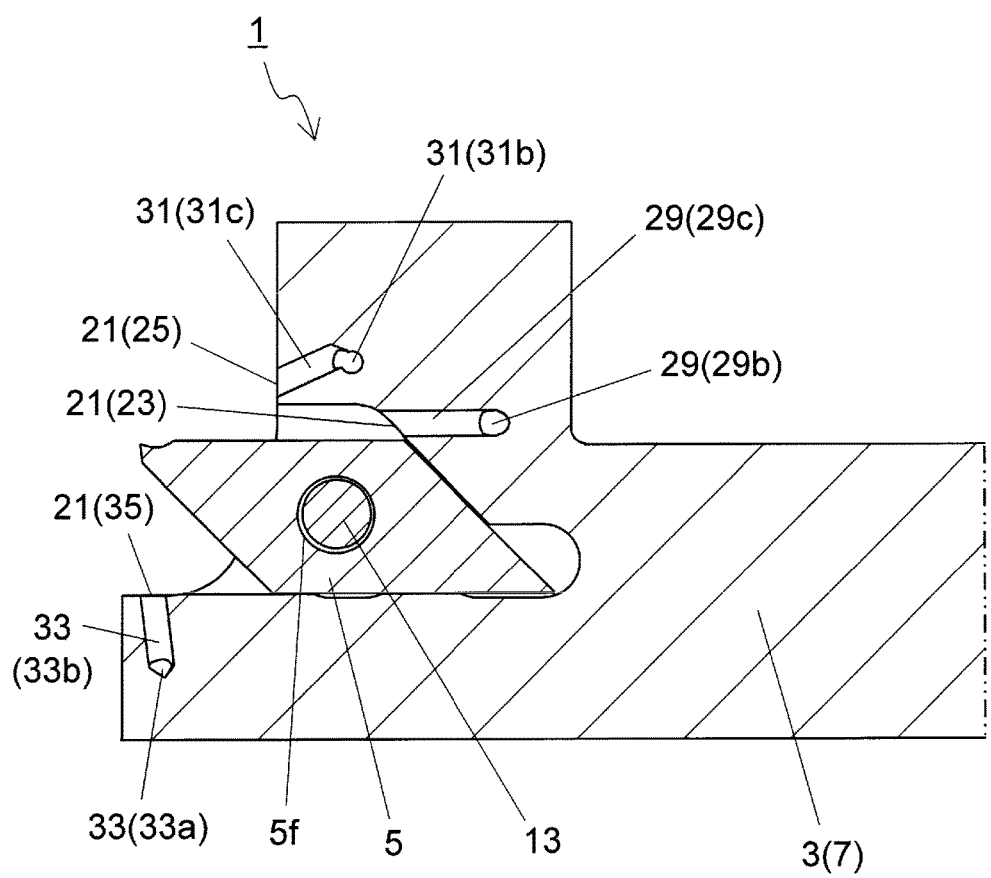
FIG. 11 is a sectional view taken along line C3-C3 in FIG. 8.
Figure 12:
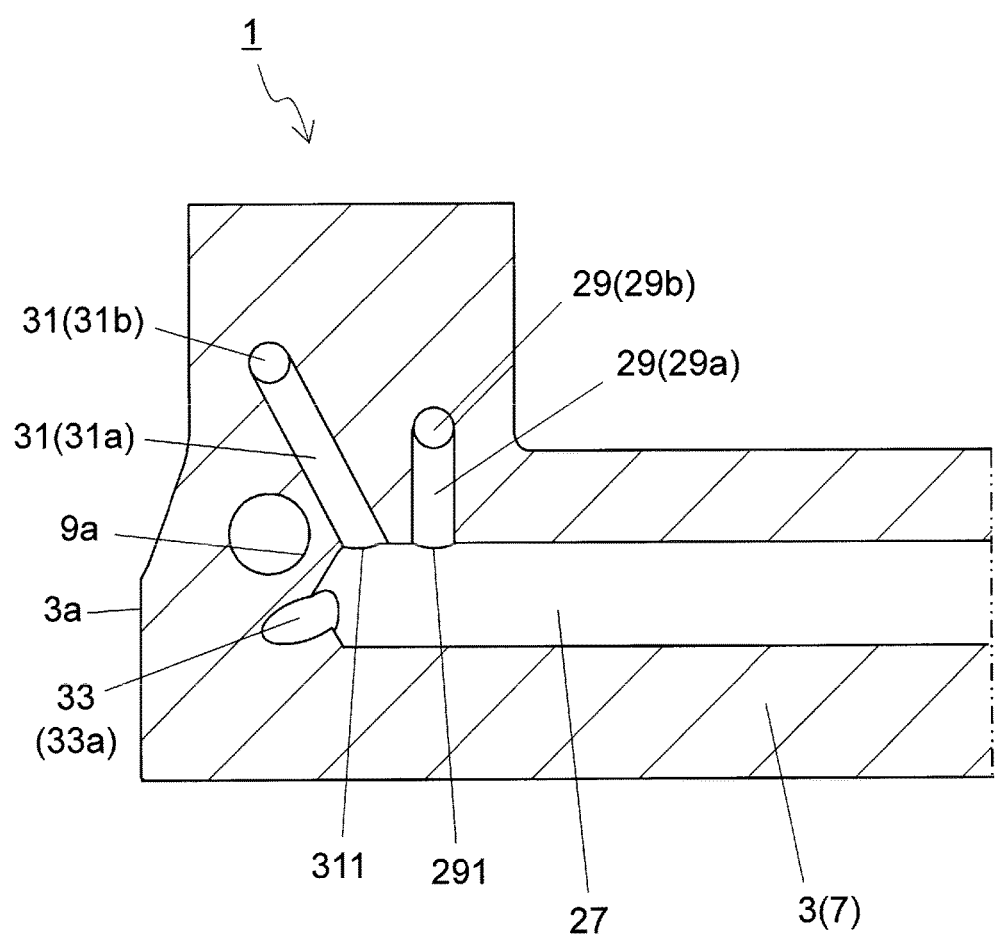
FIG. 12 is a sectional view taken along line C4-C4 in FIG. 8.
Figure 13:
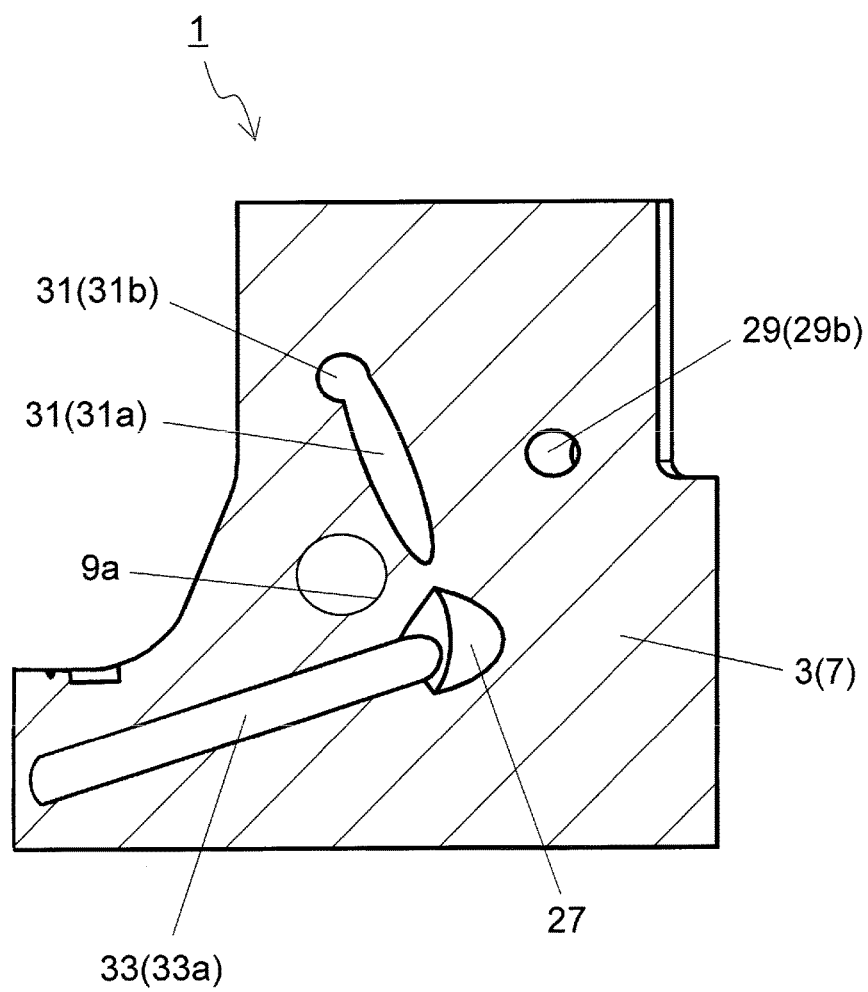
FIG. 13 is a sectional view taken along line C5-C5 in FIG. 8.

The insert 5 in the present embodiment includes an upper surface 5a, a lower surface 5b, one end surface 5c, another end surface 5e, and the cutting edge 11 as illustrated in FIG. 15. The insert 5 further includes a through hole 5f as illustrated in FIG. 11. The upper surface 5a and the lower surface 5b have a polygonal shape, namely, a square shape in the present embodiment. The one end surface 5c, the another end surface 5d, and the side surface 5e are located between the upper surface 5a and the lower surface 5b, and designed to connect to the upper surface 5a and the lower surface 5b. The one end surface 5c is one of the surfaces located between the upper surface 5a and the lower surface 5b which is located at the side of the first end 3a. The another end surface 5d is one of the surfaces located between the upper surface 5a and the lower surface 5b which is located at the side of the second end 3b. The another end surface 5d is located on the opposite side of the one end surface 5c. The side surface 5e is the surface located between the upper surface 5a and the lower surface 5b and between the one end surface 5c and the another end surface 5d. The side surface 5e in the present embodiment is a parallelogram.

The cutting edge 11 is located in at least a part of a ridge 12 where two surfaces in the insert 5 intersect each other as illustrated in FIGS. 2 and 15. In other words, the insert 5 includes the cutting edge 11 in at least a part of the ridge 12 where a first surface intersects with a second surface. In the present embodiment, the cutting edge 11 is located in at least a part of the ridge 12 where the upper surface 5a being the first surface intersects with the one end surface 5c being the second surface. The cutting edge 11 may be a part or entirety of the ridge 12. The cutting edge 11 of the present embodiment is composed of the entirety of the ridge 12.

The insert 5 includes two side surfaces 5e. The through hole 5f is located so as to extend through between one side surface 5e and another side surface 5e located on the opposite side thereof. The through hole 5f is a portion that allows insertion of a fixing member for fixing the insert 5 to the holder 3. A screw 13 is illustrated as the fixing member in FIGS. 1 to 16. Instead of the screw 13, a clamp member is usable for fixing the insert 5.

The insert 5 is fixed to the holder 3 by using the screw 13 in the embodiment illustrated in FIGS. 1 to 16. The pocket 9 of the holder 3 includes a screw hole 9a at a position corresponding to the through hole 5f (refer to FIGS. 11 and 12). The insert 5 is fixable to the holder 3 by inserting the screw 13 into the screw hole 9a and fastening the screw 13.

For example, cemented carbide or cermet is usable as a material of the insert 5. Examples of compositions of the cemented carbide include WC—Co, WC—TiC—Co, and WC—TiC—TaC—Co. The WC—Co is produced by adding cobalt (Co) powder to tungsten carbide (WC), followed by sintering. The WC—TiC—Co is produced by adding titanium carbide (TiC) to WC—Co. The WC—TiC—TaC—Co is produced by adding tantalum carbide (TaC) to WC—TiC—Co.

The cermet is a sintered composite material obtainable by compositing metal into a ceramic ingredient. A specific example of the cermet is one which is composed mainly of a titanium compound, such as titanium carbide (TiC) or titanium nitride (TiN).

A surface of the insert 5 may be coated with a coating film by using chemical vapor deposition (CVD) method or physical vapor deposition (PVD) method. As a composition of the coating film, there are, for example, titanium carbide (TiC), titanium nitride (TiN), titanium carbonitride (TiCN), and alumina ($Al_2O_3$).

The holder 3 includes a flow path 19 as illustrated in FIG. 8. The flow path 19 is located inside the holder 3. The flow path 19 includes an inflow port 17 and an outflow port 21 as illustrated in FIGS. 3 and 4. The inflow port 17 and the outflow port 21 are portions that open into a surface of the holder 3. The flow path 19 in the present embodiment includes a first opening 23 and a second opening 25 as the outflow port 21. Specifically, the flow path 19 includes a first flow path 29 and a second flow path 31 described later. The first flow path 29 includes the first opening 23, and the second flow path 31 includes the second opening 25. The first opening 23 and the second opening 25 are located at the side of the first end 3a of the holder 3. Each of the inflow port 17, the flow path 19, and the outflow port 21 functions as a region where the coolant for cooling the insert 5 flows during use of the cutting tool 1.

The flow path 19 in the present embodiment includes a main flow path 27, the first flow path 29, and the second flow path 31 as illustrated in FIG. 4 and the like. The main flow path 27 is continuous from the inflow port 17 and extends from the side of the second end 3b to the side of the first end 3a in the holder 3. The first flow path 29 is branched from the main flow path 27 and continuous with the first opening 23. The first flow path 29 rises upward from a branch port from the main flow path 27 (hereinafter referred to as "a first branch port 291") in the present embodiment. The first opening 23 is located above the cutting edge 11. The first opening 23 is located above the insert 5.

The second flow path 31 connects to the main flow path 27, and is branched from the main flow path 27 and continuous with the second opening 25. The second flow path 31 rises upward from a branch port from the main flow path 27 (hereinafter referred to as "a second branch port 311") in the present embodiment. The second opening 25 is located above the first opening 23. The second branch port 311 is located closer to the first end 3a than the first branch port 291.

The outflow port 21 is a region that allows outflow of the coolant toward the upper surface 5a of the insert 5. The flow path on a side of the first opening 23 (in the vicinity of the first opening 23) in the first flow path 29 preferably extends straight (linearly) in order to stabilize a flow direction of the coolant. For the same reason, the flow path on a side of the second opening 25 (in the vicinity of the second opening 25) in the second flow path 31 preferably extends straight (linearly). In the present embodiment, a first partial flow path 29c described later corresponds to a part of the first flow path 29 which is located at the side of the first opening 23. A second partial flow path 31c described later corresponds to a part of the second flow path 31 which is located at the side of the second opening 25. The first partial flow path 29c and the second partial flow path 31c extend linearly (refer to FIG. 8).

The coolant is supplied from the inflow port 17 to the main flow path 27, and flows through the second flow path 31 and is sprayed from the first opening 23 and the second opening 25 toward the vicinity of the cutting edge 11. The inflow port 17 is located on one side surface 3c1 of the side surface 3c in FIG. 3. The inflow port 17 may be located on, for example, another side surface 3c or an end surface at the side of the second end 3b in the holder 3. The number of the inflow port 17 may be at least one. When the number of the inflow ports 17 is two, one of the two inflow ports 17 may be located on the one side surface 3c1, and the other may be located on the end surface at the side of the second end 3b. With this configuration, the inflow port 17 to be used is selectable according to a tool machine.

Examples of the coolant include water-insoluble cutting fluids and water-soluble cutting fluids. These are usable by suitably selecting according to a workpiece material. Examples of the water-insoluble cutting fluids include oil-based and inert extreme pressure-based cutting fluids. Examples of the water-soluble cutting fluids include emulsion-type, soluble-type, and solution-type cutting fluids.

As illustrated in FIG. 4, the first flow path 29 includes first partial flow paths 29a, 29b, and 29c. The first partial flow path 29a connects to the main flow path 27. The coolant is supplied through the first partial flow paths 29a, 29b, and 29c to the first opening 23.

The first partial flow path 29a extends upward from the first branch port 291. The first partial flow path 29b connects to the first partial flow path 29a and extends in a direction to approach the insert 5. The first partial flow path 29c connects to the first partial flow path 29b and extends toward the first opening 23. The first partial flow path 29c connects to the first opening 23.

The second flow path 31 includes second partial flow paths 31a, 31b, and 31c. The second partial flow path 31a connects to the main flow path 27. The coolant is supplied through the second partial flow paths 31a, 31b, and 31c to the second opening 25.

The second partial flow path 31a extends upward from the second branch port 311. The second partial flow path 31b connects to the second partial flow path 31a and extends in a direction to approach the insert 5. The second partial flow path 31c connects to the second partial flow path 31b and extends toward the second opening 25. The second partial flow path 31c connects to the second opening 25.

As illustrated in FIG. 16, the first opening 23 and the second opening 25 in the present embodiment are located above the insert 5 in a side view. More specifically, the first opening 23 and the second opening 25 are located above the upper surface 5a of the insert 5 in the side view. This configuration contributes to reducing a distance over which the coolant flown out from the opening 23 and the second opening 25 is sprayed onto the insert 5. This makes it possible to avoid that a large amount of the coolant scatters across a region for which no cooling is necessary. The term "side view" denotes a state in which the cutting tool 1 is viewed toward the side surface 3c of the holder 3. Positions of the opening 23 and the second opening 25 with respect to the insert 5 may be defined on the basis of a state in which the cutting tool 1 is viewed from a direction vertical to a longitudinal direction "a" of the holder 3, instead of the side view.

Here, as illustrated in FIG. 16, setting is made so that a flow-out direction of the fluid from the first opening 23 is a first imaginary line L1, and a flow-out direction of the fluid from the second opening 25 is a second imaginary line L2. In the cutting tool 1 of the present embodiment, the first imaginary line L1 and the second imaginary line L2 intersect each other at an intersection point P above the insert 5 in a side view as illustrated in FIG. 16. With this configuration, the coolant flown out from the first opening 23 and the coolant flown out from the second opening 25 collide with each other above the insert 5, specifically, at the intersection point P where the first imaginary line L1 and the second imaginary line L2 intersect each other. Accordingly, the coolant flown out from the first opening 23 and the coolant flown out from the second opening 25 diffuse (scatter) from the intersection point P being a starting point. It is consequently possible to efficiently cool the insert 5 over a wide range.

The first imaginary line L1 is a line obtained by allowing a first central axis O29 at the side of the first opening 23 of the first flow path 29 to extend outward from the holder 3. The first central axis O29 is obtainable by allowing continuation of a center of an inner diameter at a straight-line shaped portion of the first flow path 29 which is located at the side of the first opening 23. The first central axis O29 in the present embodiment is obtainable by allowing continuation of the center of the inner diameter of the first partial flow path 29c.

Similarly to the first imaginary line L1, the second imaginary line L2 is obtainable by allowing a second central axis O31 at the side of the second opening 25 of the second flow path 31 to extend outward from the holder 3. The second central axis O31 is obtainable of by allowing continuation of a center of an inner diameter at a straight-line shaped portion of the second flow path 31 which is located at the side of the second opening 25. The second central axis O31 in the present embodiment is obtainable by allowing continuation of the center of the inner diameter of the second partial flow path 31c.

The second imaginary line L2 in the present embodiment intersects the insert 5 in a side view. Specifically, the second imaginary line L2 in the present embodiment is inclined downward toward the side of the first end 3a of the holder 3. More specifically, the second imaginary line L2 in the present embodiment is inclined downward toward the side of the first end 3a of the holder 3 so as to intersect the insert 5. The intersection of the second imaginary line L2 and the insert 5 makes it easier to spray, toward the insert 5, at least a part of the coolant flown out from the first opening 23 and the second opening 25. This leads to stable cooling of the insert 5.

Meanwhile, the first imaginary line L1 does not intersect the insert 5. Specifically, the first imaginary line L1 is located above the insert 5 and extends from the side of the second end 3b toward the side of the first end 3a. During the cutting process, the first imaginary line L1 extends toward chips generated by the cutting edge 11 of the insert 5. Therefore, at least a part of the coolant flown out from the first opening 23 and the second opening 25 can easily be sprayed toward the chips. Consequently, the chips can easily be discharged by the coolant. The first imaginary line L1 in the first embodiment is parallel to the upper surface 5a that is the first surface of the insert 5.

When the second imaginary line L2 intersects the insert 5 and the first imaginary line L1 does not intersect the insert 5 in a side view, at least a part of the coolant flown out from the first opening 23 and the second opening 25 flows toward the cutting edge 11. The chips are therefore less likely to be welded to the insert 5.

The second opening 25 is located closer to the side of the first end 3a than the first opening 23. With this configuration, the coolant flown out from the second opening 25 is less likely to diffuse upon contact with a region located around the first opening 23 in the body part 7 (holder 3). This leads to a stable collision between the coolant flown out from the first opening 23 and the coolant flown out from the second opening 25.

An angle θ1 formed by the first imaginary line L1 and the second imaginary line L2 is an acute angle. With this configuration, the coolant scattering over an excessively large range is avoidable when the coolants respectively flown out from the first opening 23 and the second opening 25 collide with each other. The angle θ1 is, for example, 5-40°.

The first imaginary line L1 and the second imaginary line L2 intersect each other below the second opening 25. With this configuration, the intersection point P is located in the vicinity of the insert 5, so that the coolant flown out from the first opening 23 and the second opening 25 can easily be sprayed toward the chips.

As illustrated in FIG. 4, the holder 3 in the present embodiment further includes, as the outflow port 21, a third opening 35 in addition to the first opening 23 and the second opening 25. The flow path 19 in the present embodiment further includes a third flow path 33 in addition to the main flow path 27, the first flow path 29, and the second flow path 31. The third flow path 33 includes third partial flow path 33a and 33b. The third flow path 33 is branched from the main flow path 27 and continuous with the third opening 35. In the present embodiment, the third flow path 33 is located below the insert 5, and the third opening 35 is located below the cutting edge 11. A third imaginary line L3 obtainable by allowing the third flow path 33 to extend outward from the third opening 35 is illustrated in FIG. 16.

No particular limitation is imposed on shapes of the main flow path 27, the first flow path 29, the second flow path 31, and the third flow path 33 as long as they ensure a smooth flow of the coolant. A cross section of each of the main flow path 27, the first flow path 29, the second flow path 31, and the third flow path 33, which is orthogonal to a coolant flow direction, has a circular shape. An inner diameter of the main flow path 27 is settable to approximately 3-15 mm. An inner diameter of each of the first flow path 29, the second flow path 31, and the third flow path 33 is settable to approximately 1-5 mm.

The flow path 19 can be formed by carrying out hole drilling on the body part 7 with the use of a drill or the like. A part of a hole formed by the hole drilling which does not function as the flow path 19 needs to be closed with a seal member (not illustrated) so that no coolant leaks. Examples of the seal member include solder, resin members, and screw members.

As illustrated in FIG. 16, the upper surface 5a that is the first surface of the insert 5 in the present embodiment faces the intersection point P where the first imaginary line L1 and the second imaginary line L2 intersect each other. The upper surface 5a includes a concave curved surface 15 located along the cutting edge 11. As illustrated in FIG. 15, the concave curved surface 15 is recessed toward the lower surface 5b and located closer to the side of the second end 3b than the ridge 12 on one surface constituting the ridge 12 including the cutting edge 11 (namely, the upper surface 5a in the present embodiment).

The concave curved surface 15 functions as a rake surface where the chips generated by the cutting edge 11 flow through during the cutting process. The chips are subjected to bending by flowing through the concave curved surface 15. The one end surface 5c located below the cutting edge 11 functions as a so-called flank surface. The one end surface 5c is inclined so as to approach the side of the second end 3b as going from above to below (from the upper surface 5a to the lower surface 5b).

In the cutting tool 1 of the present embodiment, the first imaginary line L1 and the second imaginary line L2 intersect each other at the point closer to the side of the second end 3b than the concave curved surface 15 as illustrated in FIG. 16. With this configuration, the coolant, which has been flown out from the first opening 23 and the second opening 25 and then collided with each other, flows stably toward the concave curved surface 15. This facilitates a smooth chip flow on the concave curved surface 15, so that the chips are less likely to be welded to the concave curved surface 15.

An intersection point of the second imaginary line L2 and the insert 5 is located on the concave curved surface 15 in a side view. In other words, the second imaginary line L2 intersects the insert 5 on the concave curved surface 15. With this configuration, the coolant flown out from the second opening 25 stably flows toward the concave curved surface 15. Hence, in combination with the effect due to the fact that the first imaginary line L1 and the second imaginary line L2 intersect each other at the point closer to the side of the second end 3b than the concave curved surface 15, the chips can easily and smoothly flow through the concave curved surface 15, and the chips are less likely to be welded to the concave curved surface 15. The second imaginary line L2 may be intersect the insert 5 at a point closer to the side of the second end 3b than the concave curved surface 15.

In a front view of the cutting tool 1 from the side of the first end 3a, the first opening 23 and the second opening 25 are located above the cutting edge 11 of the insert 5. A description is given below by referring to the drawings. When a fourth imaginary line L4 extending in a vertical direction "b" is set in FIG. 5, the cutting edge 11, the first opening 23, and the second opening 25 are located on the fourth imaginary line L4. When the cutting edge 11, the first opening 23, and the second opening 25 are thus located, it is possible to prevent that the coolant flown out from the first opening 23 and the second opening 25 unnecessarily scatters sideward of the insert 5 (in a crosswise direction "c" in FIG. 5). It is therefore possible to efficiently cool the cutting edge 11 by the coolant. The third opening 35 is also located on the fourth imaginary line L4 in the present embodiment.

Second Embodiment

A cutting tool 1 in a second embodiment of the present disclosure is described in detail below with reference to the drawings. The following description is focused on members different from those in the cutting tool 1 in the first embodiment, whereas omitting the descriptions of members of the cutting tool 1 in the second preferred embodiment which have the same configurations as those in the cutting tool 1 in the first embodiment.

Figure 18:
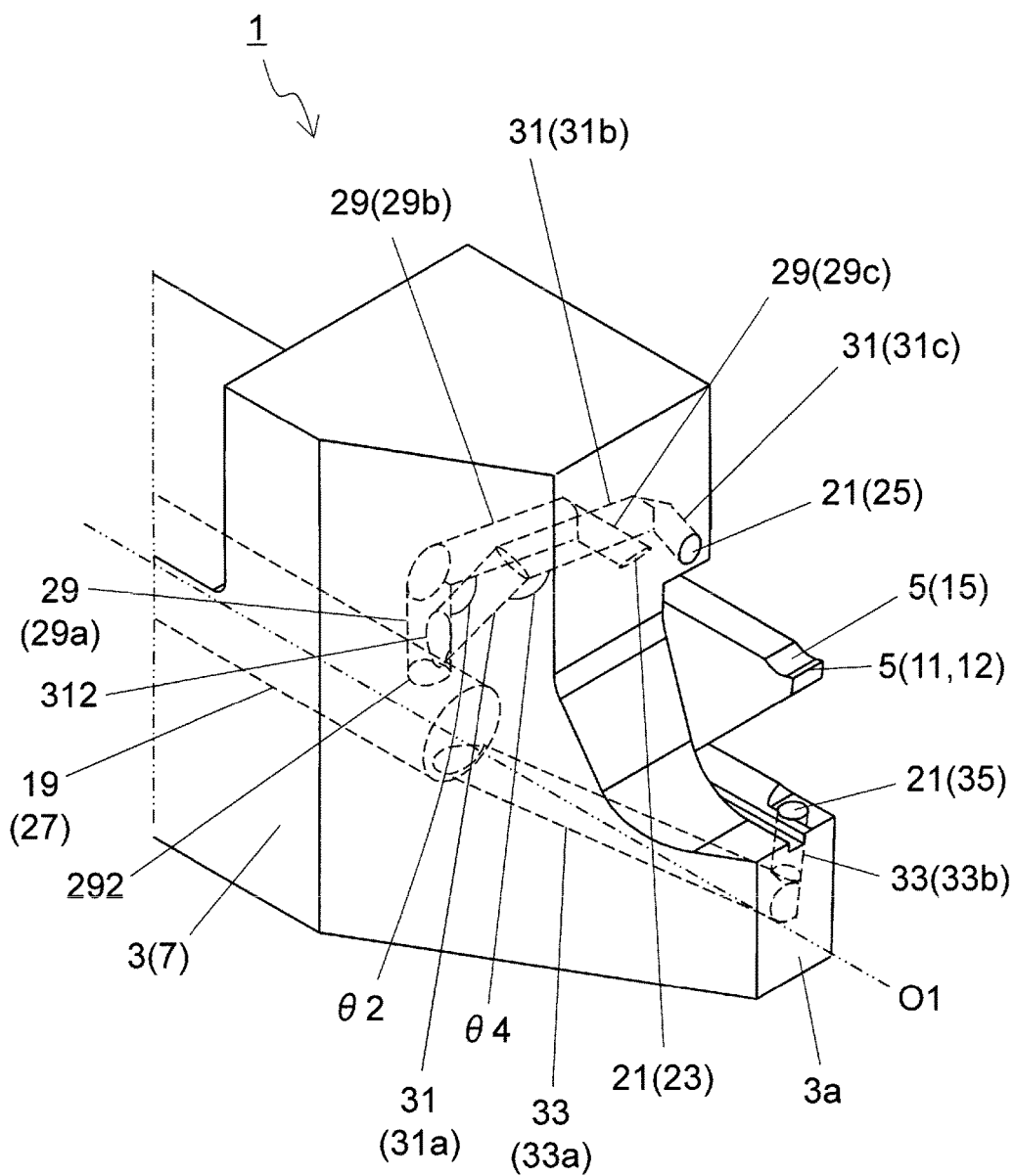
FIG. 18 is an enlarged view of a region A5 illustrated in FIG. 17.
Figure 19:
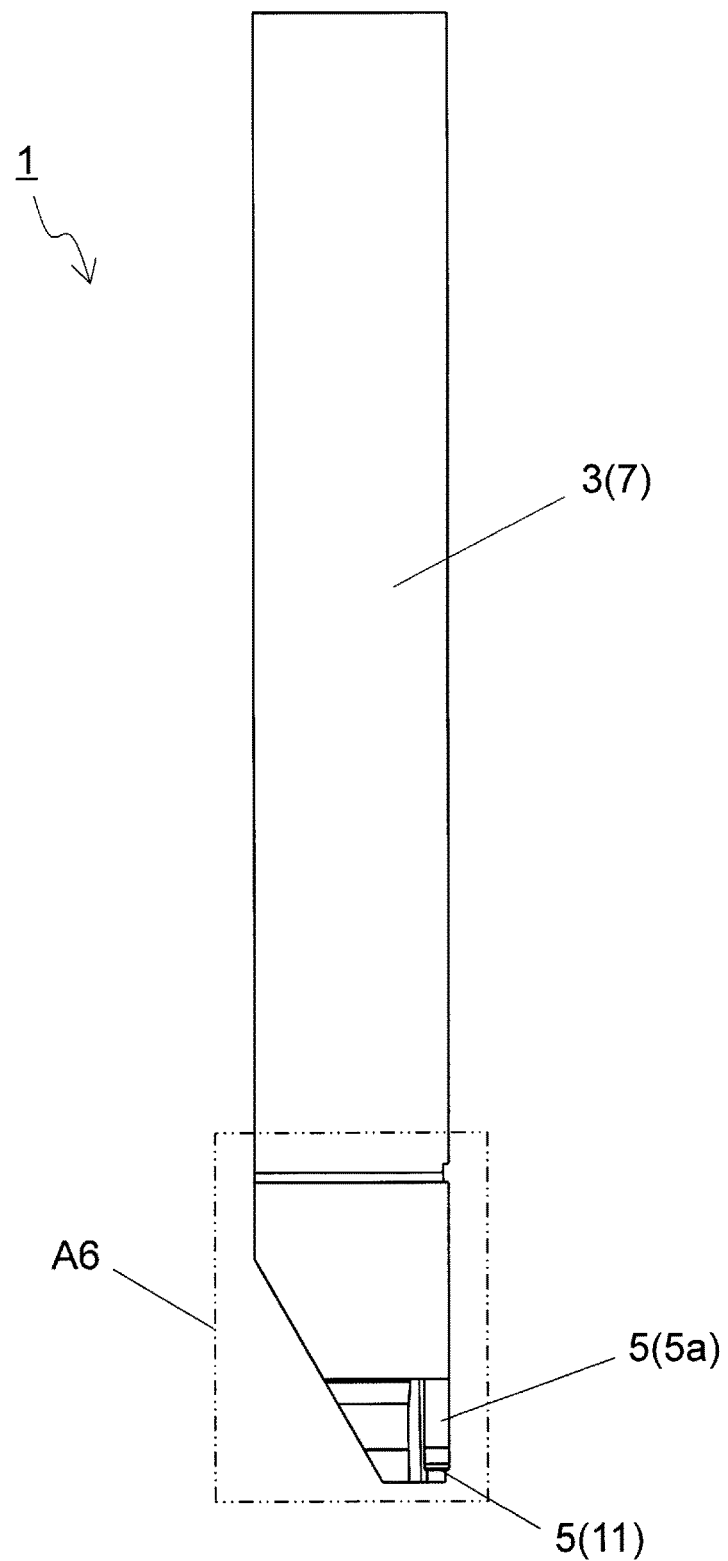
FIG. 19 is a top view when the cutting tool illustrated in FIG. 17 is viewed from B3 direction.
Figure 20:
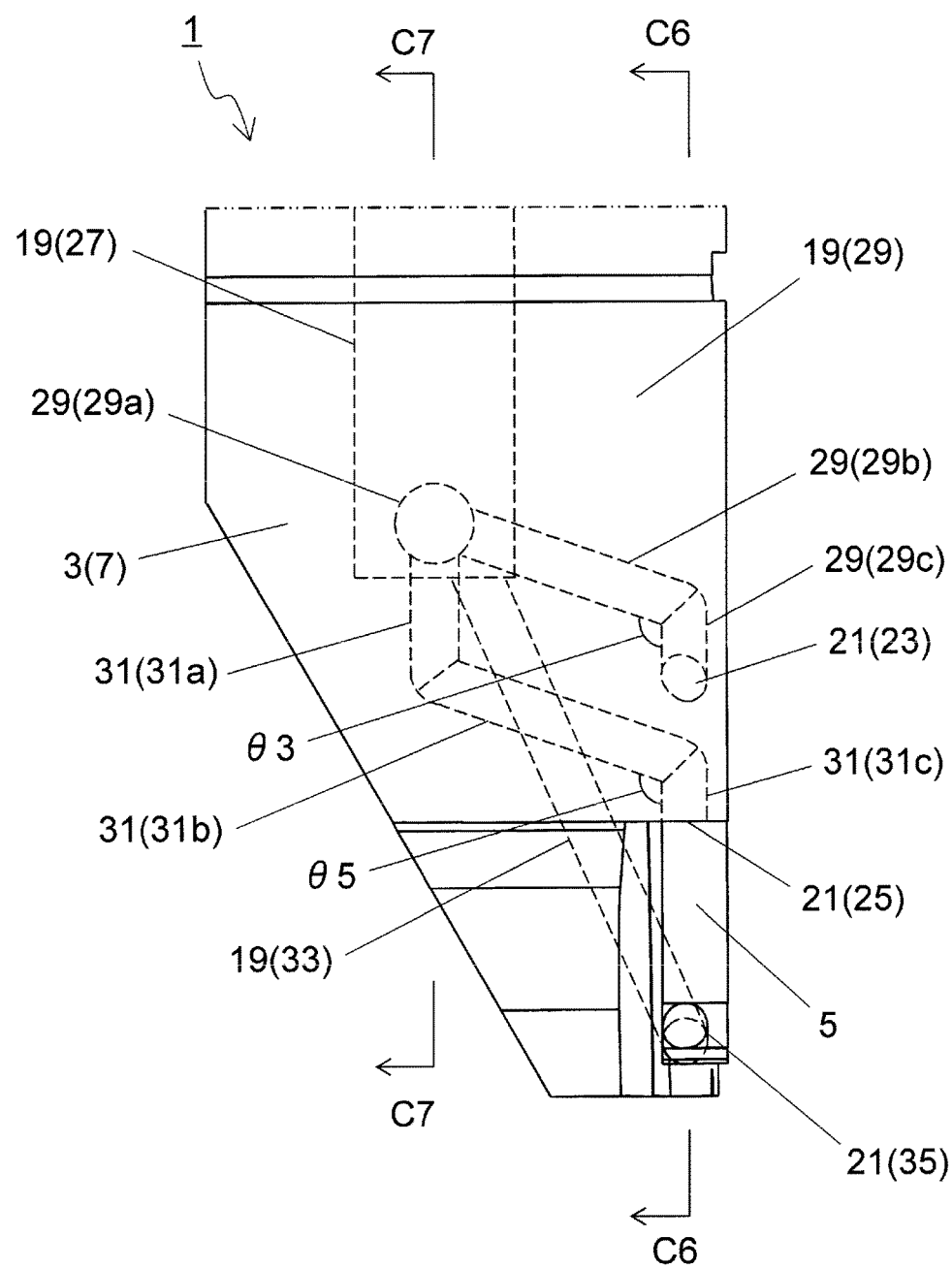
FIG. 20 is an enlarged view of a region A6 illustrated in FIG. 19.

Similarly to the cutting tool 1 in the first embodiment, the cutting tool 1 in the second embodiment includes a holder 3 including a main flow path 27, a first flow path 29, and a second flow path 31 as illustrated in FIGS. 18 and 20. As illustrated in FIG. 18, the first flow path 29 connects to the main flow path 27, and is branched from the main flow path 27 and continuous with the first opening 23. The second flow path 31 is branched from the first flow path 29 connecting to the main flow path 27, and is continuous with the second opening 25.

Specifically, the first flow path 29 includes first partial flow paths 29a, 29b, and 29c. The second flow path 31 includes second partial flow paths 31a, 31b, and 31c. The second partial flow path 31a in the second flow path 31 connects to the first partial flow path 29a in the first flow path 29. Similarly to the first embodiment, the second opening 25 is located above the insert 5 and the first opening 23. Thus, the second flow path 31 may connect to the first flow path 29 instead of the main flow path 27. Alternatively, the second flow path 31 may connect to the main flow path 27, and the first flow path 29 may be branched from the second flow path 31.

Figure 21:
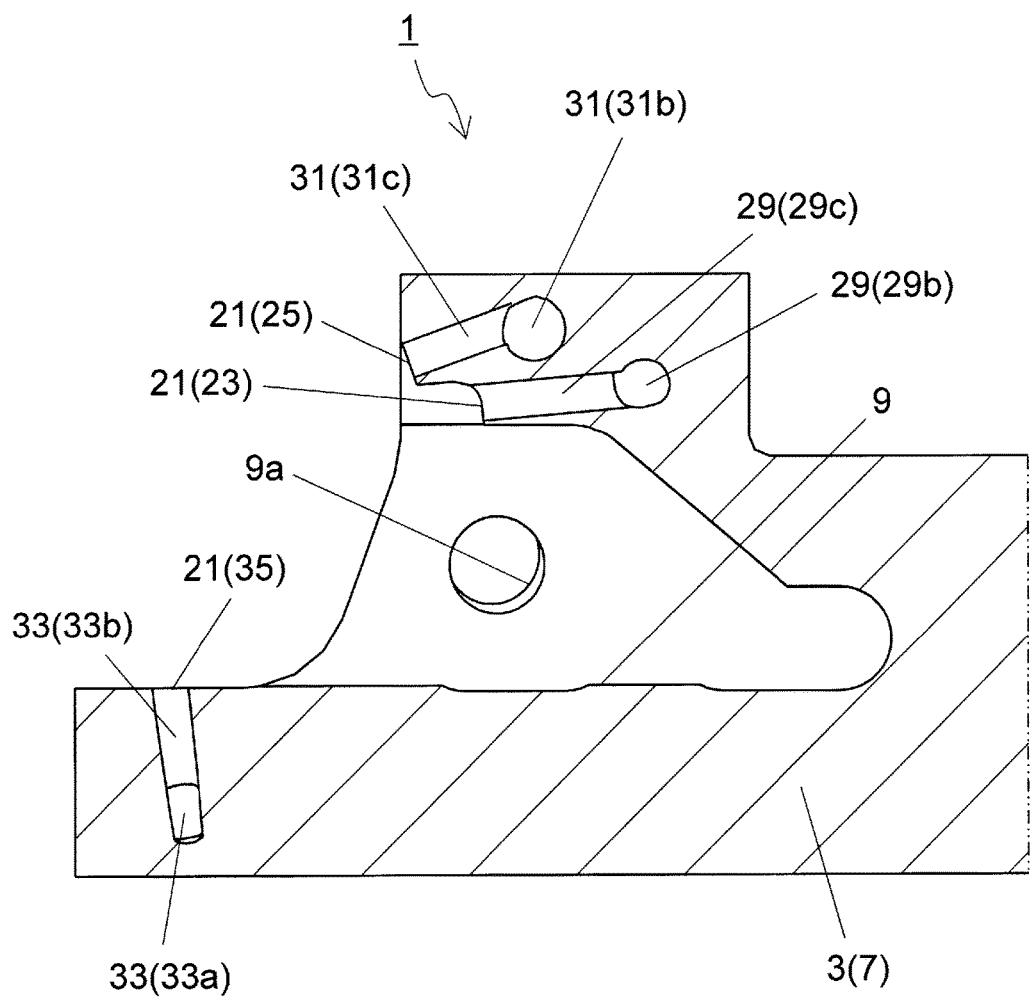
FIG. 21 is a sectional view taken along line C6-C6 in FIG. 20
Figure 22:
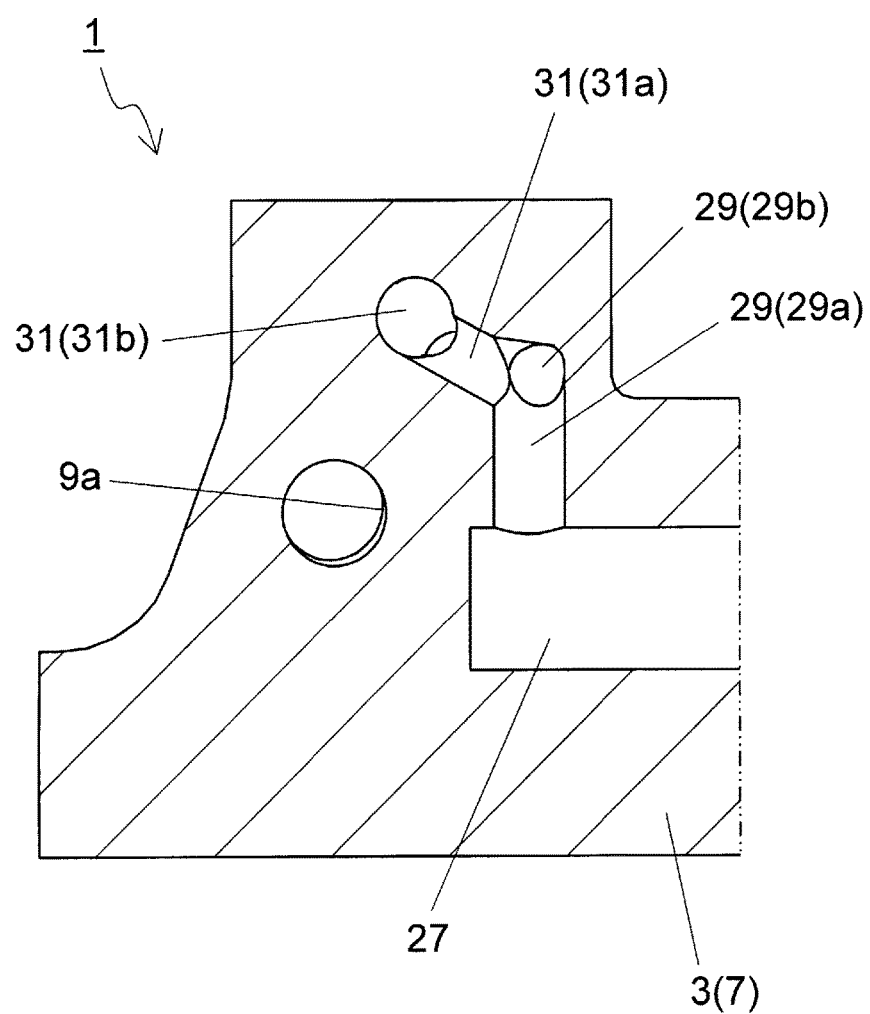
FIG. 22 is a sectional view taken along line C7-C7 in FIG. 20.

Similarly to the first embodiment, the cutting tool 1 in the present embodiment includes a screw 13 (refer to FIG. 1) for fixing the insert 5 to the holder 3. A pocket 9 of the holder 3 includes a screw hole 9a as illustrated in FIGS. 21 and 22. When the second flow path 31 is branched from the first flow path 29 instead of the main flow path 27, it is easy to keep the first flow path 29 away from the screw hole 9a. It is therefore possible to enhance strength of the screw hole 9a.

In a configuration that the first opening 23 is located above the insert 5 and the second opening 25 is located above the first opening 23, the second flow path 31 is preferably located above the screw hole 9a. When the second flow path 31 is located above the screw hole 9a, the second flow path 31 is therefore located away from the screw hole 9a, thus leading to enhanced strength of the screw hole 9a. In order to make the second flow path 31 located above the screw hole 9a, the second flow path 31 needs to be branched from the first partial flow path 29a rising up from the main flow path 27 as illustrated in FIG. 18. The second flow path 31 may be branched from the first partial flow path 29b being continuous with the first partial flow path 29a.

As illustrated in FIGS. 18 and 20, the first partial flow path 29b is inclined upward and inclined from a branch port 292 toward the insert 5. Accordingly, the first partial flow path 29b connects to the first partial flow path 29a so as to form an obtuse angle therebetween. The first partial flow path 29c connects to the first partial flow path 29b so as to form an obtuse angle therebetween. In other words, the first flow path 29 includes a plurality of first partial flow paths 29a, 29b, and 29c, in which the first partial flow paths 29a, 29b, and 29c adjacent to each other connect to each other at obtuse angles. This leads to a smooth coolant flow from the first partial flow path 29a to the first partial flow path 29b. This also leads to a smooth coolant flow from the first partial flow path 29b to the first partial flow path 29c. An angle θ2 formed by the first partial flow path 29a and the first partial flow path 29b is, for example, an angle exceeding 90°, but not exceeding 150°. An angle θ3 formed by the first partial flow path 29b and the first partial flow path 29c is, for example, an angle exceeding 90°, but not exceeding 150°.

As illustrated in FIGS. 18 and 20, the second partial flow path 31b is inclined upward and inclined from a branch port 312 toward the insert 5. Accordingly, the second partial flow path 31b connects to the second partial flow path 31a so as to form an obtuse angle therebetween. The second partial flow path 31c connects to the second partial flow path 31b so as to form an obtuse angle therebetween. In other words, the second flow path 31 includes a plurality of second partial flow paths 31a, 31b, and 31c, in which the second partial flow paths 31a, 31b, and 31c adjacent to each other connect to each other at obtuse angles. This leads to a smooth coolant flow in a direction from the second partial flow path 31a to the second partial flow path 31b. This also leads to a smooth coolant flow from the second partial flow path 31b to the second partial flow path 31c. An angle θ4 formed by the second partial flow path 31a and the second partial flow path 31b is, for example, an angle exceeding 90°, but not exceeding 150°. An angle θ5 formed by the second partial flow path 31b and the second flow path flow 31c is, for example, an angle exceeding 90°, but not exceeding 150°.

<Method of Manufacturing Machined Product>

A method of manufacturing a machined product in one embodiment of the present disclosure is described below with reference to the drawings.

The machined product is manufacturable by subjecting a workpiece 101 to a cutting process. The method of manufacturing the machined product in the present embodiment includes the following steps of:

(1) rotating the workpiece 101;

(2) bringing the cutting tool 1 as typified by the foregoing embodiment into contact with the workpiece 101 being rotated; and (3) moving the cutting tool 1 away from the workpiece 101.

Figure 23:
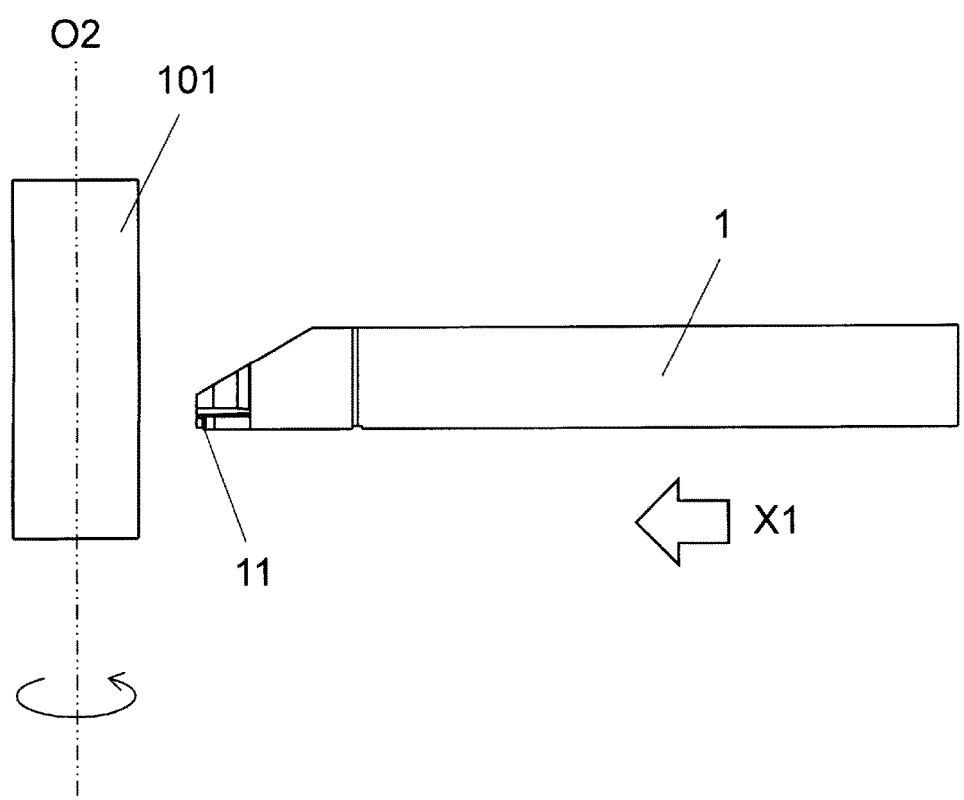
FIG. 23 is a schematic diagram illustrating a step in a method of manufacturing a machined product in one embodiment of the present disclosure.
Figure 24:
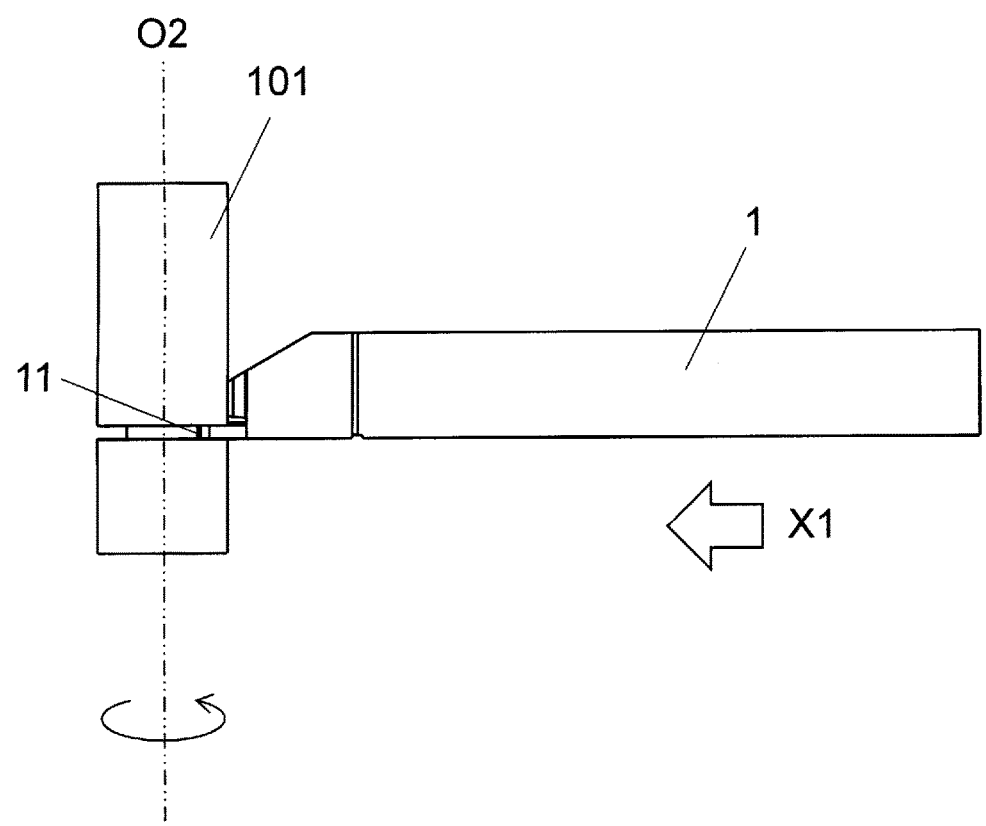
FIG. 24 is a schematic diagram illustrating a step in the method of manufacturing a machined product in the embodiment of the present disclosure.
Figure 25:
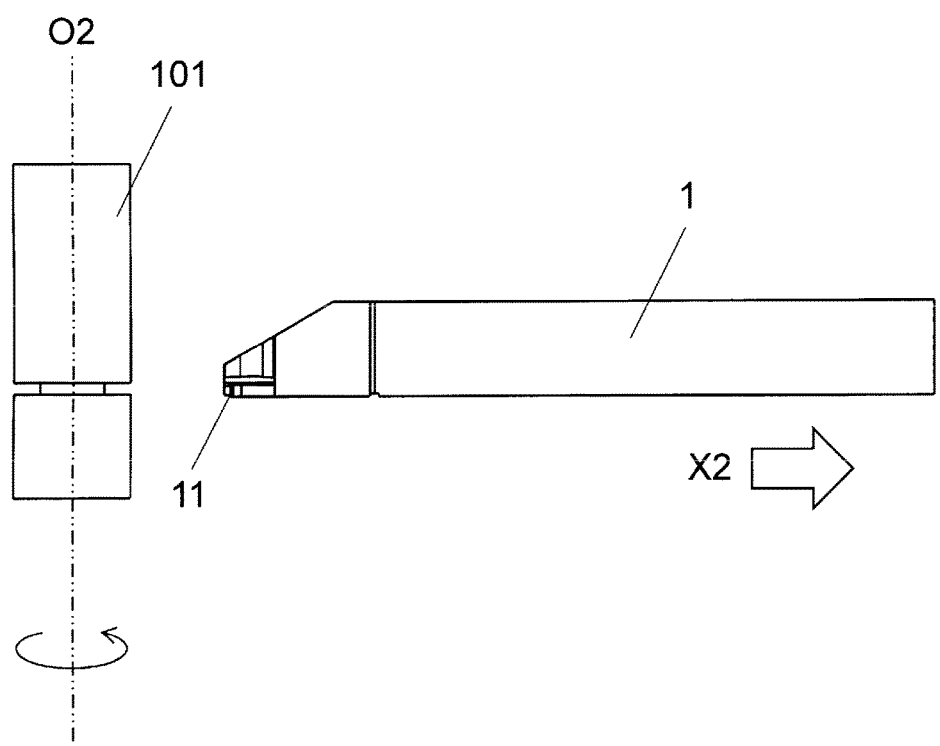
FIG. 25 is a schematic diagram illustrating a step in the method of manufacturing a machined product in the embodiment of the present disclosure.

More specifically, as illustrated in FIG. 23, a first step is to bring the cutting tool 1 relatively near the workpiece 101, while rotating the workpiece 101 around an axis O2. A subsequent step is to cut the workpiece 101 by bringing the cutting edge 11 in the cutting tool 1 into contact with the workpiece 101 being rotated, as illustrated in FIG. 24. Here, the workpiece 101 is preferably cut while allowing a coolant to flow out from each of the first opening 23 and the second opening 25. A final step is to move the cutting tool 1 relatively away from the workpiece 101 as illustrated in FIG. 25.

In the present embodiment, the cutting tool 1 is brought near the workpiece 101 by moving the cutting tool 1 in X1 direction, while the axis O2 is fixed and the workpiece 101 is being rotated. In FIG. 24, the workpiece 101 is cut by bringing the cutting edge 11 in the insert 5 into contact with the workpiece 101 being rotated. In FIG. 25, the cutting tool 1 is kept away from the workpiece 101 by moving the cutting tool 1 in X2 direction, while the workpiece 101 is kept rotating.

Although the cutting tool 1 is brought into contact with the workpiece 101, or the cutting tool 1 is kept away from the workpiece 101 by moving the cutting tool 1 in the individual steps during the cutting process in the manufacturing method of the present embodiment, it is, of course, not intended to limit to this embodiment.

For example, in the step (1), the workpiece 101 may be brought near the cutting tool 1. Similarly, in the step (3), the workpiece 101 may be kept away from the cutting tool 1. When the cutting process is continued, it is necessary to repeat the step of bringing the cutting edge 11 in the insert 5 into contact with different portions of the workpiece 101, while the workpiece 101 is kept rotating.

Examples of the material of the workpiece 101 include carbon steel, alloy steel, stainless steel, cast iron, and nonferrous metals.

While the embodiments in the present disclosure have been illustrated and described above, the present disclosure is not limited to the foregoing embodiments.

It is, of course, possible to make any arbitrary ones insofar as they do not depart from the gist of the present disclosure.

Figure 26:
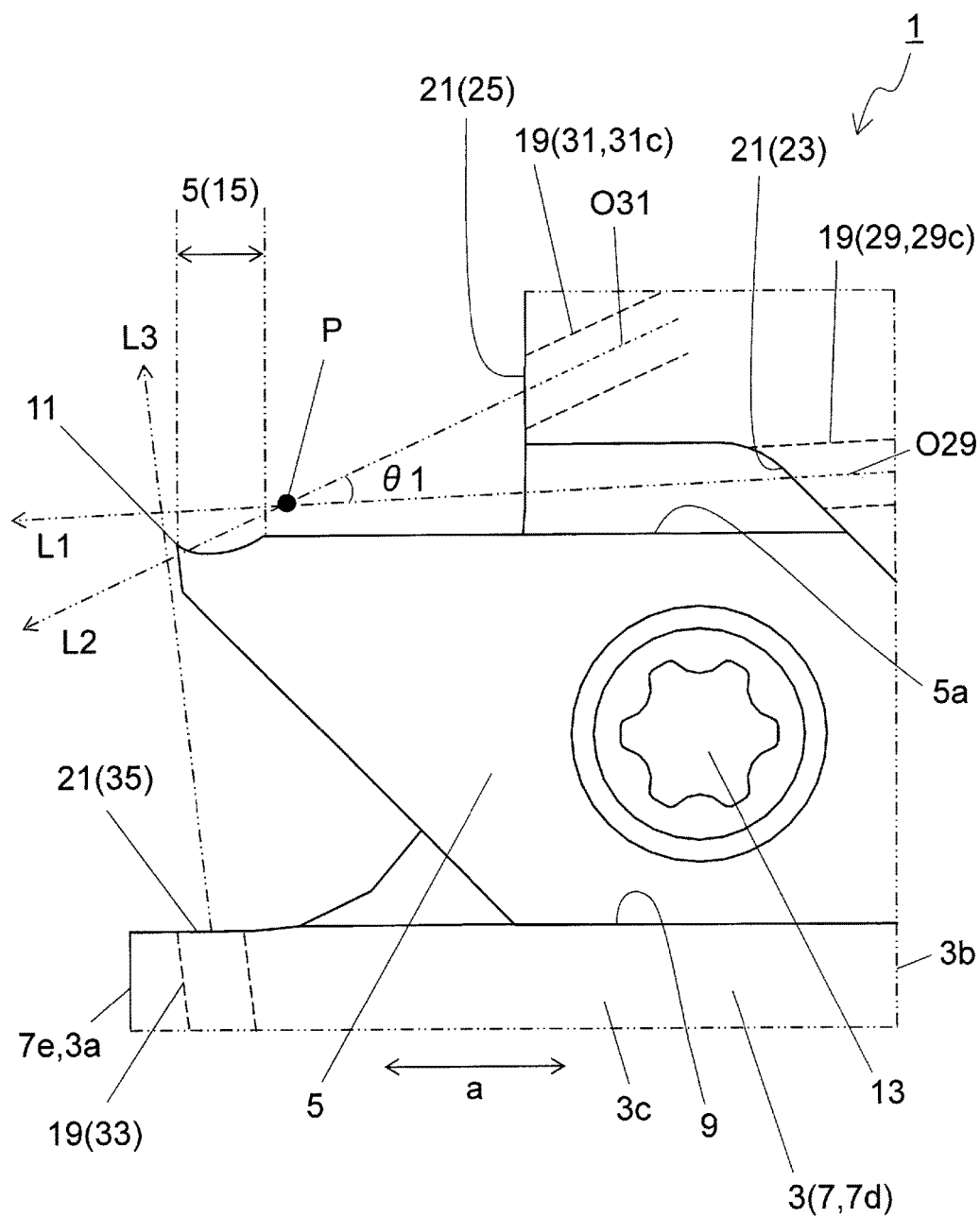
FIG. 26 is a schematic diagram illustrating a cutting tool in one embodiment of the present disclosure, which corresponds to FIG. 16 in the first embodiment.

For example, the first imaginary line L1 is parallel to the upper surface 5a that is the first surface of the insert 5 in the foregoing embodiment. In an alternative embodiment, the first imaginary line L1 may be inclined downward toward the side of the first end 3a of the holder 3 as illustrated in FIG. 26. When besides the second imaginary line L2, the first imaginary line L1 is inclined, it is possible to decrease the angle θ1 at which the first imaginary line L1 and the second imaginary line L2 intersect each other. It is consequently possible to avoid the coolant scattering over an excessively large range when the coolants respectively flown out from the first opening 23 and the second opening 25 collide with each other.

Figure 27:
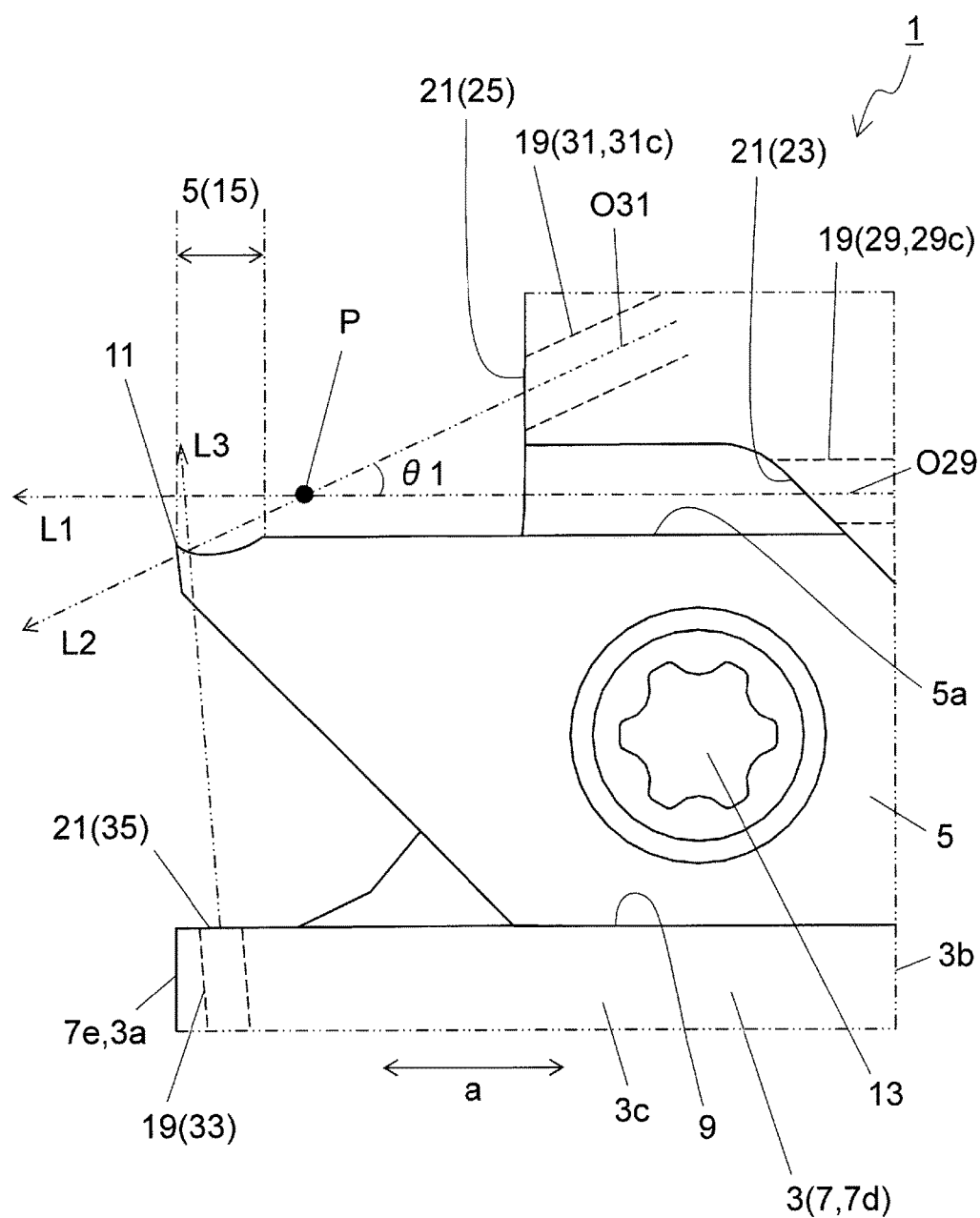
FIG. 27 is a schematic diagram illustrating a cutting tool in another embodiment of the present disclosure, which corresponds to FIG. 16 in the first embodiment.

In the foregoing embodiment, the insert 5 is located at the pocket 9 in the state in which the cutting edge 11 does not protrude from a front end 7e of the lower jaw 7d as illustrated in FIG. 16. In an alternative embodiment, the insert 5 may be located at the pocket 9 in a state in which the cutting edge 11 is located immediately above the front end 7e of the lower jaw 7d as illustrated in FIG. 27. Still alternatively, the insert 5 may be located at the pocket 9 in a state in which the cutting edge 11 protrudes from the front end 7e of the lower jaw 7d.

For example, the configuration of the cutting tool 1 in the first embodiment may be applied to the configuration of the cutting tool 1 in the second embodiment. In other words, the configurations of the cutting tools 1 in the foregoing embodiments are applicable to the cutting tool 1 in another embodiment without departing from the technical ideas of the present disclosure.

DESCRIPTION OF THE REFERENCE NUMERAL 1 cutting tool
3 holder
3a first end
3b second end
3c side surface
3c1 one side surface
insert
5a upper surface
5b lower surface
5c one end surface
5d another end surface
5e side surface
5f through hole
7 body part
7a base member
7b head
7c upper jaw
7d lower jaw
7e front end
9 pocket
9a screw hole
11 cutting edge
12 ridge
13 screw
15 concave curved surface
17 inflow port
19 flow path
21 outflow port
23 first opening
25 second opening
27 main flow path
29 first flow path
29a, 29b, 29c first partial flow path 291 first branch port
292 branch port
second flow path
31a, 31b, 31c second partial flow path
311 second branch port
312 branch port
33 third flow path
33a, 33b third partial flow path
35 third opening
101 workpiece
L1 first imaginary line
L2 second imaginary line
L3 third imaginary line
L4 fourth imaginary line
P intersection point
O1 central axis
O29 first central axis
O31 second central axis
O2 axis
"a" longitudinal direction
"b" vertical direction
"c" crosswise direction

What is claimed is:

1. A cutting tool, comprising:
a holder having a shape extending from a first end to a second end, and comprising
a flow path comprising an inflow port and an outflow port, and
a pocket located at a side of the first end; and
an insert located at the pocket and comprising:
a first surface,
a second surface, and
a cutting edge located in at least a part of a ridge where the first surface intersects with the second surface,
wherein the flow path comprises a first flow path and a second flow path,
wherein the first flow path comprises, as the outflow port, a first opening located at a side of the first end and located above the insert,
wherein the second flow path comprises, as the outflow port, a second opening located at a side of the first end and located above the first opening, and
wherein a first imaginary line and a second imaginary line intersect each other above the insert when the first imaginary line is a line obtained by allowing a first central axis at a side of the first opening of the first flow path to extend outward from the holder, and the second imaginary line is a line obtained by allowing a second central axis at a side of the second opening of the second flow path to extend outward from the holder.

2. The cutting tool according to claim 1,
wherein the flow path further comprises a main flow path being continuous from the inflow port,
wherein the first flow path is branched from the main flow path, and
wherein the second flow path is branched from the main flow path or the first flow path.

3. The cutting tool according to claim 1,
wherein the first surface faces an intersection point where the first imaginary line and the second imaginary line intersect each other,
wherein the first surface comprises a concave curved surface located along the cutting edge, and
wherein the first imaginary line and the second imaginary line intersect each other at a point before reaching the concave curved surface.

4. The cutting tool according to claim 3, wherein the second imaginary line intersects the insert on the concave curved surface.

5. The cutting tool according to claim 1, wherein the second imaginary line intersects the insert, and the first imaginary line does not intersect the insert.

6. The cutting tool according to claim 1, wherein the second imaginary line is inclined downward toward a side of the first end.

7. The cutting tool according to claim 6, wherein the first imaginary line is inclined downward toward the side of the first end.

8. The cutting tool according to claim 6, wherein the first imaginary line is parallel to the first surface.

9. The cutting tool according to claim 1, wherein the second opening is located at a point closer to a side of the first end than the first opening.

10. The cutting tool according to claim 1,
wherein the pocket comprises a screw hole, and
wherein the second flow path is located above the screw hole.

11. The cutting tool according to claim 1, wherein the first opening and the second opening are located above the insert.

12. The cutting tool according to claim 1, wherein an angle θ1 formed by the first imaginary line and the second imaginary line is an acute angle.

13. The cutting tool according to claim 1, wherein the first imaginary line and the second imaginary line intersect each other below the second opening.

14. A method of manufacturing a machined product, comprising:
rotating a workpiece;
bringing a cutting tool according to claim 1 into contact with the workpiece being rotated; and
moving the cutting tool away from the workpiece.

* * * * *